(12) United States Patent
Katabi et al.

(10) Patent No.: US 9,313,072 B2
(45) Date of Patent: Apr. 12, 2016

(54) INTEGRATED CIRCUIT IMPLEMENTATION OF METHODS AND APPARATUSES FOR MONITORING OCCUPANCY OF WIDEBAND GHZ SPECTRUM, AND SENSING RESPECTIVE FREQUENCY COMPONENTS OF TIME-VARYING SIGNALS USING SUB-NYQUIST CRITERION SIGNAL SAMPLING

(71) Applicants: Dina Katabi, Cambridge, MA (US); Omid Salehi-Abari, Cambridge, MA (US); Ezzeldin Hamed, Cambridge, MA (US); Haitham Z. Al-Hassanieh, Cambridge, MA (US); Lixin Shi, Cambridge, MA (US); Abhinav Agarwal, Waltham, MA (US); Anantha Chandrakasan, Belmont, MA (US); Vladimir Stojanovic, Berkeley, CA (US)

(72) Inventors: Dina Katabi, Cambridge, MA (US); Omid Salehi-Abari, Cambridge, MA (US); Ezzeldin Hamed, Cambridge, MA (US); Haitham Z. Al-Hassanieh, Cambridge, MA (US); Lixin Shi, Cambridge, MA (US); Abhinav Agarwal, Waltham, MA (US); Anantha Chandrakasan, Belmont, MA (US); Vladimir Stojanovic, Berkeley, CA (US)

(73) Assignee: Massachussetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/548,238

(22) Filed: Nov. 19, 2014

(65) Prior Publication Data

US 2015/0146826 A1 May 28, 2015

Related U.S. Application Data

(60) Provisional application No. 61/906,262, filed on Nov. 19, 2013, provisional application No. 61/916,527, filed on Dec. 16, 2013, provisional application No. 61/937,350, filed on Feb. 7, 2014, provisional application No. 62/005,527, filed on May 30, 2014.

(51) Int. Cl.
*H04L 27/26* (2006.01)
*H04B 1/40* (2015.01)

(Continued)

(52) U.S. Cl.
CPC ............. *H04L 27/265* (2013.01); *H04B 1/40* (2013.01); *H04L 27/0006* (2013.01); *H04L 27/2666* (2013.01); *G01P 3/489* (2013.01); *H04L 25/03038* (2013.01); *H04L 27/263* (2013.01)

(58) Field of Classification Search
None
See application file for complete search history.

(56) References Cited

U.S. PATENT DOCUMENTS

| 5,831,883 A | 11/1998 | Suter et al. |
| 2002/0034222 A1* | 3/2002 | Buchwald et al. ............ 375/232 |

(Continued)

OTHER PUBLICATIONS

Abari, O. et al., "Performance trade-offs and design limitations of analog-to-information converter front-ends", Massachusetts Institute of Technology, Department of EECS, Cambridge, MA, in ICASSP, (2012), 14 pages.

(Continued)

*Primary Examiner* — Leon-Viet Nguyen
(74) *Attorney, Agent, or Firm* — Cooley LLP

(57) ABSTRACT

An ASIC for monitoring wideband GHz spectrum to sense respective frequency components present in the spectrum. The ASIC implements Fast Fourier Transform (FFT) techniques to facilitate identification of one or more frequency components of a sparse signal after the signal is sub-sampled at a rate below the Nyquist criterion. The ASIC computes a first Fast Fourier Transform (FFT) of a first sub-sampled set of samples of a time-varying signal representing the monitored spectrum and sampled at a first sampling rate, and further computes a second FFT of a second sub-sampled set of samples of the time-varying signal sampled at a second sampling rate different from the first sampling rate. In one example, each of the first FFT and the second FFT is a low-radix FFT to facilitate a low-power and low-cost ASIC implementation of wideband spectrum sensing.

30 Claims, 21 Drawing Sheets

(51) Int. Cl.
  *H04L 27/00* (2006.01)
  *H04L 25/03* (2006.01)
  *G01P 3/489* (2006.01)

(56) References Cited

U.S. PATENT DOCUMENTS

| | | | | |
|---|---|---|---|---|
| 2002/0181617 | A1* | 12/2002 | Carleton | 375/316 |
| 2006/0075010 | A1* | 4/2006 | Wadleigh et al. | 708/404 |
| 2008/0240269 | A1 | 10/2008 | Pajukoski et al. | |
| 2009/0222226 | A1* | 9/2009 | Baraniuk et al. | 702/66 |
| 2009/0248775 | A1 | 10/2009 | Loncke | |
| 2010/0174769 | A1 | 7/2010 | Modlin et al. | |
| 2012/0041996 | A1* | 2/2012 | Ayinala et al. | 708/404 |
| 2012/0243597 | A1 | 9/2012 | Currivan et al. | |
| 2012/0310601 | A1* | 12/2012 | Martin | 702/190 |
| 2014/0153616 | A1* | 6/2014 | Sabouri et al. | 375/219 |

OTHER PUBLICATIONS

Abari, O. et al., "Why Analog-to-Information Converters Suffer in High-Bandwidth Sparse Signal Applications", IEEE Transactions on Circuits and Systems—I, (2013), 12 pages.
Bahl, P. et al., "White Space Networking with Wi-Fi like Connectivity", ACM SIGCOMM, (2009), p. 27-38.
Baykas, T. et al., "Developing a Standard for TV White Space Coexistence: Technical Challenges and Solution Approaches", Wireless Comm., IEEE, vol. 19, No. 1, (2012), 26 pages.
Chen, D. et al., "Mining Spectrum Usage Data: a Large-scale Spectrum Measurement Study", MobiCom, (2009), 12 pages.
Chen, Y. et al. "A. 2.4-Gsample/s DVFS FFT Processor for MIMO OFDM Communication Systems", IEEE Journal of Solid-State Circuits, vol. 43, No. 5, (May 2008), pp. 1260-1273.
Ghazi, B. et al., "Sample-Optimal Average-Case Sparse Fourier Transform in Two Dimensions", Allerton, (Oct. 2013), 30 pages.
Gilbert, A. et al., "Improved Time Bounds for Near-Optimal Space Fourier Representations", In SPIE, (2005), 15 pages.
Greshishchev, Y. M. et al., "21.7 A 40GS/s 6b ADC in 65nm CMOS", ISSCC 2010 / Session 21 / Successive Approximation ADCs / 21.7, IEEE Solid-State Circuits Conference, (2010), p. 390-392.
Hassanieh, H. et al., "Simple and Practical Algorithm for Sparse Fourier Transform", in SODA, (2012), 12 pages.
Hassanieh, H. et al., "BigBand: GHz-Wide Sensing and Decoding on Commodity Radios", Computer Science and Artificial Intelligence Laboratory Technology Report, Massachusetts Institute of Technology, Cambridge, MA, MIT-CSAIL-TR-2013-009, (May 22, 2013), 13 pages.
Hassanieh, H. et al., "Nearly Optimal Sparse Fourier Transform", In STOC, (2012), pp. 1-28.
Herley, C. et al., "Minimum Rate Sampling and Reconstruction of Signals with Arbitrary Frequency Support", IEEE Transactions on Information Theory, vol. 45, No. 5, (1999), pp. 1555-1564.
Hong, S. S. et al., "DOF: a Local Wireless Information Plane", ACM SIGCOMM, (2011), pp. 230-241.
Iyer, A.P. et al., "SpecNet: Spectrum Sensing Sans Frontiéres", NSDI, (2011), pp. 1-14.
Laska, J. et al., "Compressive sensing for dynamic spectrum access networks: Techniques tradeoffs", IEEE International Symposium on Dynamic Spectrum Access Networks, DySPAN, (2011), pp. 156-163.
Mishali, M. et al., "From Theory to Practice: Sub-Nyquist Sampling of Sparse Wideband Analog Signals", IEEE Journal of Selected Topics in Signal Processing, vol. 4, No. 2, (2009), pp. 1-17.
Mishali, M. et al., "Wideband Spectrum Sensing at Sub-Nyquist Rates", Applications CORNER, IEEE Signal Processing Magazine, vol. 28, No. 4, (2011), pp. 102-135.
Murmann, B., "A/D converter Trends: Power Dissipation, Scaling and Digitally Assisted Architectures", IEEE 2008 Custom Integrated Circuits Conference, (CICC), (2008), pp. 105-112.

Pawar, S. et al., "Computing a k-sparse n-length Discrete Fourier Transform using at most 4K samples and O(k log k) complexity", 2013 IEEE International Symposium on Information Theory, (2013), pp. 464-468.
Rahul, H., et al., "Learning to Share: Narrowband-Friendly Wideband Networks", ACM SIGCOMM, (2008), 12 pages.
Rashidi, M. et al., "A NLLS based Sub-Nyquist Rate Spectrum Sensing for Wideband Cognitive Radio", 2011 IEEE International Symposium on Dynamic Spectrum Access Networks, (DySPAN), (2011), pp. 545-551.
RFeye Node, "Distributed Spectrum Monitoring and Surveillance for indoor/outdoor use", CRFS Limited, Cambridge Research Park, Beach Drive, Cambridge, CB25 9TL, United Kingdom, http://media.crfs.com/uploads/files12/crfs-md00011-c00-rfeye-node.pdf, (Jan. 2013), 2 pages.
Seok, M. et al., "A 0.27V 30MHz 17.7nJ/transform 1024-pt Complex FFT Core with Super-Pipelining", ISSCC 2011 / Session 19 / Low-Power Digital Techniques / 19.6, 2011 IEEE International Solid-State Circuits Conference, (2011), pp. 342-344.
sFFT C++ code, "SFFT: Sparse Fast Fourier Transform", Massachusetts Institute of Technology, Cambridge, MA, http://groups.csail.mit.edu/netmit/sFFT/code.html, (2015), 1 page.
Silva, A., "Reconstruction of Undersampled Periodic Signals", Research Laboratory of Electronics Technical Report No. 514, Massachusetts Institute of Technology, Cambridge, MA, (Jan. 1986), 122 pages.
Tan, Y. et al., "A 2.4GHZ WLAN Transceiver with Fully-integrated Highly-linear 1.8V 28.4dBm PA, 34dBm T/R Switch, 240MS/s DAC, 320MS/s ADC, and DPLL in 32nm SoC CMOS", IEEE 2012 Symposium on VLSI Circuits Digest of Technical Papers, (2012), pp. 76-77.
Tropp, J. et al., "Beyond Nyquist: Efficient Sampling of Sparse Bandlimited Signals", IEEE Transactions of Information Theory, vol. 56, No. 1, (2010), pp. 520-544.
Tzou, N. et al., "Low-Cost Wideband Periodic Signal Reconstruction Using Incoherent Undersampling and Back-end Cost Optimization", in IEEE inter Test Conference, 2012.
Vaidyanathan, P. et al., "Sparse Sensing With Co-Prime Samplers and Arrays", IEEE Transactions on Signal Processing, vol. 59, No. 2, (2011), pp. 573-586.
Venkataramani, R. et al., "Perfect Reconstruction Formulas and Bounds on Aliasing Error in Sub-Nyquist Nonuniform Sampling of Multiband Signals", IEEE Transactions on Information Theory, vol. 46, No. 6, (2000), pp. 2173-2183.
Xia, X.-G., "On Estimation of Multiple Frequencies in Undersampled Complex Valued Waveforms", IEEE Transactions on Signal Processing, vol. 47, No. 12, (1999), pp. 3417-3419.
Xia, X.-G., "An Efficient Frequency-Determination Algorithm from Multiple Undersampled Waveforms", IEEE Transactions on Signal Processing Letters, vol. 7, No. 2, (2000), pp. 34-37.
Yang, C. et al., "Power and Area Minimization of Reconfigurable FFT Processors: A 3GPP-LTE Example," IEEE Journal of Solid-State Circuits, vol. 47, No. 3, (2012), pp. 757-768.
Yoo, J. et al., "A 100MHz-2GHz 12.5x sub-Nyquist Rate Receiver in 90nm CMOS", IEEE RFIC, (2012), 4 pages.
Yoo, J. et al., "A Compressed Sensing Parameter Extraction Platform for Radar Pulse Signal Acquisition", JETCAS, (2012), 12 pages.
Yoon, S. et al., "QuickSense: Fast and Energy-Efficient Channel Sensing for Dynamic Spectrum Access Wireless Networks", IEEE INFOCOM, (2013), 9 pages.
Yucek, T. et al., "A Survey of Spectrum Sensing Algorithms for Cognitive Radio Applications", IEEE Communications Surveys & Tutorials, vol. 11, No. 1, (2009), 15 pages.
Zhong, G. et al., "A Power-Scalable Reconfigurable FFT/IFFT IC Based on a Multi-Processor Ring," IEEE Journal of Solid-State Circuits, vol. 41, No. 2, (2006), pp. 483-495.
Notification of Transmittal of the International Search Report and the Written Opinion of the International Search Authority in related PCT Application No. PCT/US2014/66459, filed Nov. 19, 2014, mailed Feb. 25, 2015, 11 pages.

* cited by examiner

|  | Seok | Chen | Yang | This work |
|---|---|---|---|---|
| Technology | 65 nm | 90 nm | 65 nm | 45 nm |
| Signal Type | Any Signal | Any Signal | Any Signal | Freq.-Sparse signal |
| Size | $2^{10}$-point | $2^8$-point | $2^7$ to $2^{11}$-point | $3^6 \times 2^{10}$-point |
| Word width | 16 bits | 10 bits | 12 bits | 12 bits |
| Area | 8.29mm$^2$ | 5.1mm$^2$ | 1.37mm$^2$ | 0.6mm$^2$ |
| Effective Throughput | 240MS/s | 2.4GS/S | 1.25-20MS/s | 36.4-109.2GS/s |
| Energy/Sample | 17.2pJ | 50pJ | 19.5-50.6pJ | 0.4-1.6pJ |

| Processor | Intel Core i7 Quad Core (3.4GHz) | This work (1.5GHz) |
|---|---|---|
| Run-time | 600µs | 6.8µs |

$2^{10} \times 3^6$ point sparse Fourier transform

FIG. 15

INTEGRATED CIRCUIT IMPLEMENTATION OF METHODS AND APPARATUSES FOR MONITORING OCCUPANCY OF WIDEBAND GHZ SPECTRUM, AND SENSING RESPECTIVE FREQUENCY COMPONENTS OF TIME-VARYING SIGNALS USING SUB-NYQUIST CRITERION SIGNAL SAMPLING

CROSS-REFERENCES TO RELATED APPLICATIONS

This application claims the benefit, under 35 U.S.C. §119 (e), of the following U.S. Provisional Applications:

Ser. No. 62/005,527, entitled "Methods And Apparatus For Sensing And Decoding Respective Frequency Components Of Time-Varying Signals Using Sub-Nyquist Criterion Signal Sampling," filed May 30, 2014;

Ser. No. 61/937,350, entitled "Methods And Apparatus For Sensing And Decoding Respective Frequency Components Of Time-Varying Signals Using Sub-Nyquist Criterion Signal Sampling," filed Feb. 7, 2014;

Ser. No. 61/916,527, entitled "Integrated Circuit Architecture To Improve Fourier Transform Efficiency For Sparse Signals," filed on Dec. 16, 2013; and Ser. No. 61/906,262, entitled "Integrated Circuit Architecture To Improve Fourier Transform Efficiency For Sparse Signals," filed on Nov. 19, 2013.

All of the aforementioned applications are hereby expressly incorporated by reference in their entirety.

GOVERNMENT SUPPORT

This invention was made with government support under Grant No. CNS1116864 awarded by the National Science Foundation and under Contract No. HR0011-10-3-0002 awarded by Defense Advanced Research Projects Agency and under Contract No. FA8721-05-C-0002 awarded by the U.S. Air Force. The government has certain rights in the invention.

BACKGROUND

The rising popularity of wireless communication and the potential of a spectrum shortage have motivated the United States Federal Communications Commission (FCC) to take steps towards releasing multiple bands of spectrum for dynamic spectrum sharing. The government's interest in re-purposing the spectrum for sharing is motivated by the fact that the actual utilization of the spectrum is sparse in practice. For instance, FIG. 1A from the Microsoft Spectrum Observatory in Seattle, Wash., USA (i.e., an example of an urban area), shows that large swaths of spectrum in the gigahertz (GHz) range remain underutilized in this region. To use the spectrum more efficiently, the President's Council of Advisors on Science and Technology (PCAST) has advocated dynamic sharing of much of the currently under-utilized spectrum, which would create GHz-wide spectrum super-highways that can be shared by many different types of wireless services (just as vehicles share a superhighway by moving from one lane to another). For example, multiple ultra-wideband links can share the same wideband spectrum by using orthogonal time-hopping codes for time-modulated systems, or orthogonal pulses and orthogonal codes for fast-pulse-based systems.

Existing methods for spectrum sensing, like those used in the Microsoft Spectrum Observatory, rely on sequential hopping from one relatively small portion of the spectrum (e.g., a "channel" or "band") to another relatively small portion of the spectrum, typically acquiring only tens of MHz at a time. In another example of spectrum sensing, some conventional spectrum analyzers (e.g., the SPECMON series spectrum analyzers from Tektronix, see hwww.tek.com/spectrum-analyzer/specmon) offer advertised real time bandwidths of up to 165 MHz. In either of the foregoing examples, however, respective and relatively smaller bands of a wider overall spectrum are monitored only occasionally, making it easy to miss short lived signals (e.g., radar) in a given band of a wider swath of GHz spectrum.

SUMMARY

Given a wide spectrum of gigahertz (GHz) bandwidth that ultimately will be available for wireless communication (e.g., via dynamic spectrum sharing), the Inventors have recognized and appreciated that innovative wideband spectrum sensing techniques would facilitate reliable and accurate detection of a presence or an absence of signals over an appreciably expanded communication spectrum.

In one aspect, the Inventors have recognized and appreciated that a difficulty in capturing (i.e., sensing) a wide swath of GHz bandwidth in essentially real time stems from the conventional need for high-speed analog-to-digital converters (ADCs), which are costly, consume significant power, and have a relatively low bit resolution as compared with conventional low-speed ADCs used in WiFi devices or cellular phones. For example, a conventional 100 MS/s ADC, typically employed in Wi-Fi receivers, costs a few dollars, consumes a few milli Watts, and has a 12 to 16-bit resolution, whereas a high speed ADC that can take multiple giga-samples per second may cost hundreds of dollars, consume multiple orders of magnitude more power, and have only 6 to 8-bits resolution.

In view of the foregoing, according to various inventive embodiments discussed in detail herein, the Inventors have developed a conceptual framework referred to herein as "Big-Band" that enables GHz-wide spectrum sensing and effective reception (e.g., decoding) of one or more sensed signals in one or more bands of the wide spectrum using relatively low-power radios (e.g., similar to those employed in conventional WiFi devices). Making GHz-wide sensing (i.e. the ability to detect occupancy of a frequency band by one or more signals) and reception (i.e. the ability to decode information modulated on one or more carriers of a signal) available on relatively inexpensive and low power wireless communication devices (also referred to herein as "commodity radios") enables a variety of new communication-related applications, devices and techniques across multiple user sectors (e.g., government, industrial/commercial, scientific/academic, consumer).

For example, real time GHz sensing enables highly dynamic spectrum access in which short (e.g., sub-millisecond) spectrum vacancies can be identified and utilized, thereby increasing the overall spectrum efficiency. Further, a relatively inexpensive and low-power GHz spectrum sensing technology facilitates deployment in a metropolitan area (or other relatively densely populated areas) of a significant number (e.g., thousands) of wireless receivers configured with such a technology for large-scale real time GHz spectrum monitoring. Such a deployment of GHz spectrum sensing receivers enables a better understanding of spectrum utilization, identification and localization of breaches of spectrum policy, and a more-informed planning of spectrum allocation.

Beyond sensing, the ability to decode signals in a GHz-wide band according to various embodiments of the present invention enables a single receiver of a wireless communication device to receive concurrent transmissions from diverse parts of the spectrum and with different information encoding protocols, and effectively decode such transmissions. This ability enables a new class of wireless devices according to various embodiments of the present invention (e.g., cell phones, Smartphones, tablet computers, laptop computers, wearable smart devices, and/or the like), as shown in FIG. 1B, in which one wireless receiver of a wireless device 140 may be employed to concurrently receive and respectively decode Bluetooth signals at 2.4 GHz (141), signals according to the GSM standard at 1.9 GHz (142), and signals according to the CDMA standard at 1.7 GHz (143), for example. In another example, the wireless device 140 may include a transmitter 145 that is configured to transmit signals using any one or more of various communication protocols (e.g., Bluetooth, GSM, CDMA).

In general, some embodiments of the present invention relate to a wireless communication system comprising a wideband RF receiver and associated antenna, an analog-to-digital converter (ADC) apparatus to digitally sample a wideband signal output by the wideband receiver and corresponding to monitored wideband spectrum, and a Fast Fourier Transform (FFT) processing apparatus to process digital samples of the received signal so as to sense and facilitate decoding of respective frequency components of the received signal.

More specifically, in some embodiments of such a wireless communication system, the wideband receiver and associated antenna (also referred to herein as the "front end" of the system) receives one or more discreet RF signals encoded with information and having respective carrier frequencies over a wide GHz band. In one sense, the collection of such discreet RF signals may be viewed as respective components of a time-varying signal provided as an output of the wideband receiver and representing the monitored GHz bandwidth. This time-varying signal is then uniformly subsampled by one or more analog-to-digital converters (ADCs) of the ADC apparatus to provide "under sampled" digital samples of the time-varying signal corresponding to the monitored GHz bandwidth. These digital samples are then processed by one or more sparse Fast Fourier Transform (sFFT) processors of the FFT processing apparatus, which "recover" (e.g., provide information about the presence of) the respective frequency components of the time-varying signal corresponding to the GHz bandwidth monitored by the wideband receiver. In some implementations, the FFT processing apparatus provides a digital output that includes information pertaining to the frequency of each detected frequency component, and a corresponding complex magnitude and phase of each detected frequency component (also referred to as a "complex value" of a given frequency component). For example, in some embodiments the information pertaining to sensed frequency components may be provided as an N-bit digital word representing the frequency components that are present in the time-varying signal corresponding to the monitored GHz bandwidth (e.g., each bit representing whether a respective frequency component is occupied or not). Other alternative forms for the output of the FFT processing apparatus are discussed below in connection with FIGS. 2A-2C.

In some embodiments of the present invention, at least some elements of such a wireless communication system are implemented on an application specific integrated circuit (ASIC) chip. For example, an ASIC chip according to one embodiment serves as the FFT processing apparatus of a wireless communication system and implements an N-point FFT (e.g., to provide an N-bit digital word representing the frequency components that are present in the time-varying signal corresponding to the monitored GHz bandwidth). In one specific implementation discussed in greater detail herein, the ASIC chip may be configured to provide a 12-bit 746,496-point ($2^{10} \times 3^6$-point) FFT that can be implemented with two different sizes of sFFTs (e.g., $2^{10}$ point, and $3^6$-point) based on low radix FFT designs. Three sFFTs of each size are employed in the ASIC chip to respectively process corresponding sets of digital samples of the time varying signal representing the monitored GHz bandwidth (e.g., samples shifted by 0, 1 and 32 samples, respectively). The ASIC chip can further include one 1024-word and one 729-word SRAMs to facilitate implementation of the $2^{10}$-point and three $3^6$-point FFTs, respectively.

In some embodiments of the present invention, an integrated circuit apparatus is introduced to determine an N-point Fast Fourier Transform (FFT) of a time-varying signal so as to sense one or more frequency components of the time-varying signal. The apparatus comprises an input/output interface to receive a first sub-sampled set of samples of the time-varying signal sampled at a first sampling rate and a second sub-sampled set of samples of the time-varying signal sampled at a second sampling rate different from the first sampling rate; and at least one processor communicatively coupled to the input/output interface to: A) compute a first Fast Fourier Transform (FFT) for the first sub-sampled set of samples of the time-varying signal; and B) compute a second FFT for the second sub-sampled set of samples of the time-varying signal, wherein each of the first FFT and the second FFT is a low-radix FFT.

In some embodiments of the present invention, an ASIC apparatus is introduced to determine an N-point Fast Fourier Transform (FFT) of a sampled time-varying signal so as to sense one or more frequency components of the sampled time-varying signal, the time-varying signal having a frequency bandwidth of interest BW and a Nyquist sampling criteria of N samples in a sampling time T, wherein N=T×BW, the sampled time-varying signal including a first sub-sampled set of $B_1$ samples of the time-varying signal and a second sub-sampled set of $B_2$ samples of the time-varying signal. The apparatus comprises an input/output interface to receive the first sub-sampled set of $B_1$ samples and the second sub-sampled set of $B_2$ samples, wherein $B_1=N/p_1$, $B_2=N/p_2$, and wherein $p_2$ and $p_1$ are co-prime numbers and both less than N; and at least one processor communicatively coupled to the input/output interface to: A) compute a first $B_1$-point Fast Fourier Transform (FFT) for the first set of $B_1$ samples of the time-varying signal; B) compute a second $B_2$-point FFT for the second set of $B_2$ samples of the time-varying signal; and C) compute the N-point FFT of the sampled time-varying signal based at least in part on A) and B), wherein: each of the first $B_1$-point FFT and the second $B_1$-point FFT is a low-radix FFT; and the input/output interface is configured to output the N-point FFT from C) so as to provide an indication of the one or more frequency components of the sampled time-varying signal.

In some embodiments of the present invention, an ASIC apparatus is introduced to calculate a Fast Fourier Transform (FFT) of a signal. The ASIC apparatus comprises first circuitry implementing at least one first FFT having a first number of spectrum points; and second circuitry implementing at least one second FFT having a second number of spectrum points, wherein the first number and the second number are different.

In some embodiments of the present invention, an ASIC apparatus is introduced for calculating a Fast Fourier Transform (FFT) of a signal. The ASIC apparatus comprises an input/output interface adapted to receive a discrete z-point signal, z being a product of at least two numbers; one or more first $x^n$-word memory blocks configured to store $x^n$ signal points sub-sampled by $z/x^n$ from the z-point signal; one or more second $y^m$-word memory blocks configured to store $y^m$ signal points sub-sampled by $z/y^m$ from the z-point signal, wherein x and y are co-prime numbers and n and m are natural numbers, and a microprocessor for calculating the FFT of the signal, the microprocessor comprising: a bucketization microarchitecture to sub-sample the received signal and alias signal points to buckets whose number is less or equal to z, and a reconstruction microarchitecture designed to estimate a magnitude value and a frequency index of one or more frequency components of the z-point signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 15 shows a comparative data table illustrating measured energy efficiency and performance of the example implementation of an FFT processing apparatus according to the block diagrams of FIGS. 11A-B.

DETAILED DESCRIPTION

Figure 1A:
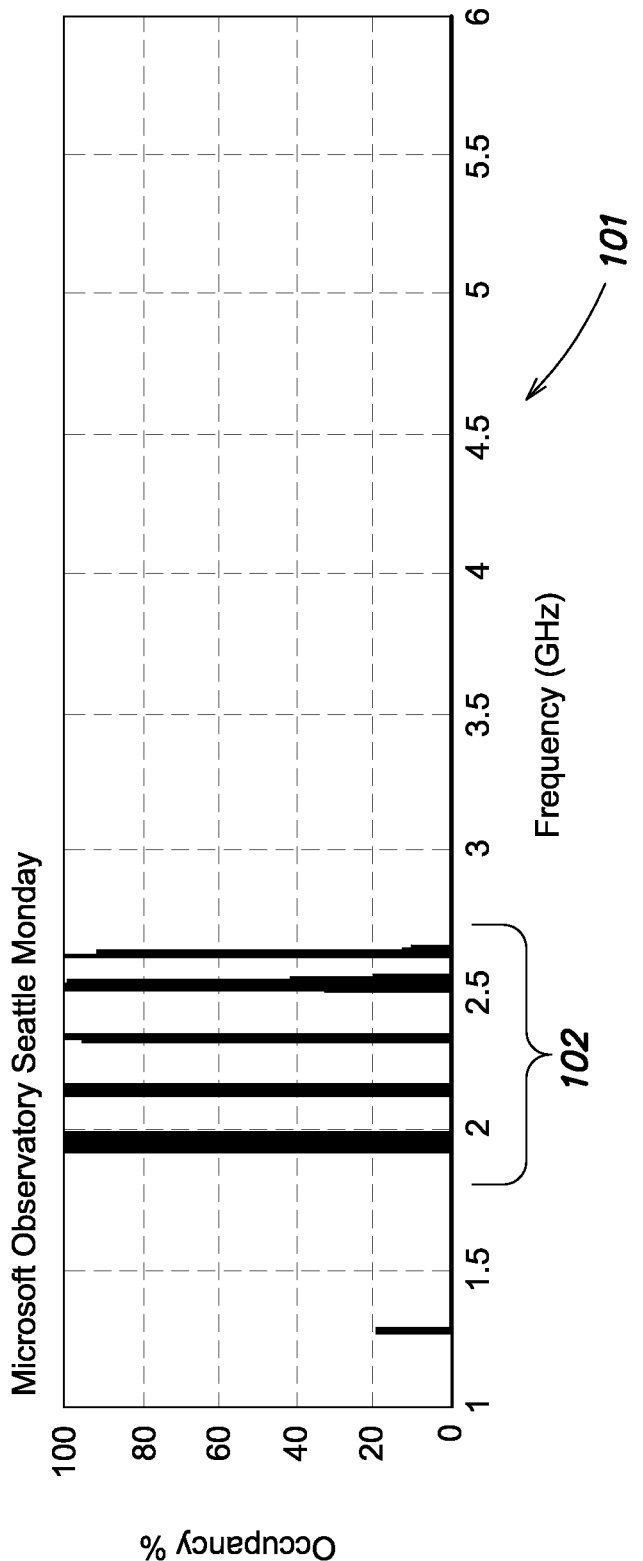
FIG. 1A shows exemplary data illustrating large swaths of spectrum in the GHz frequency range remain underutilized.
Figure 1B:
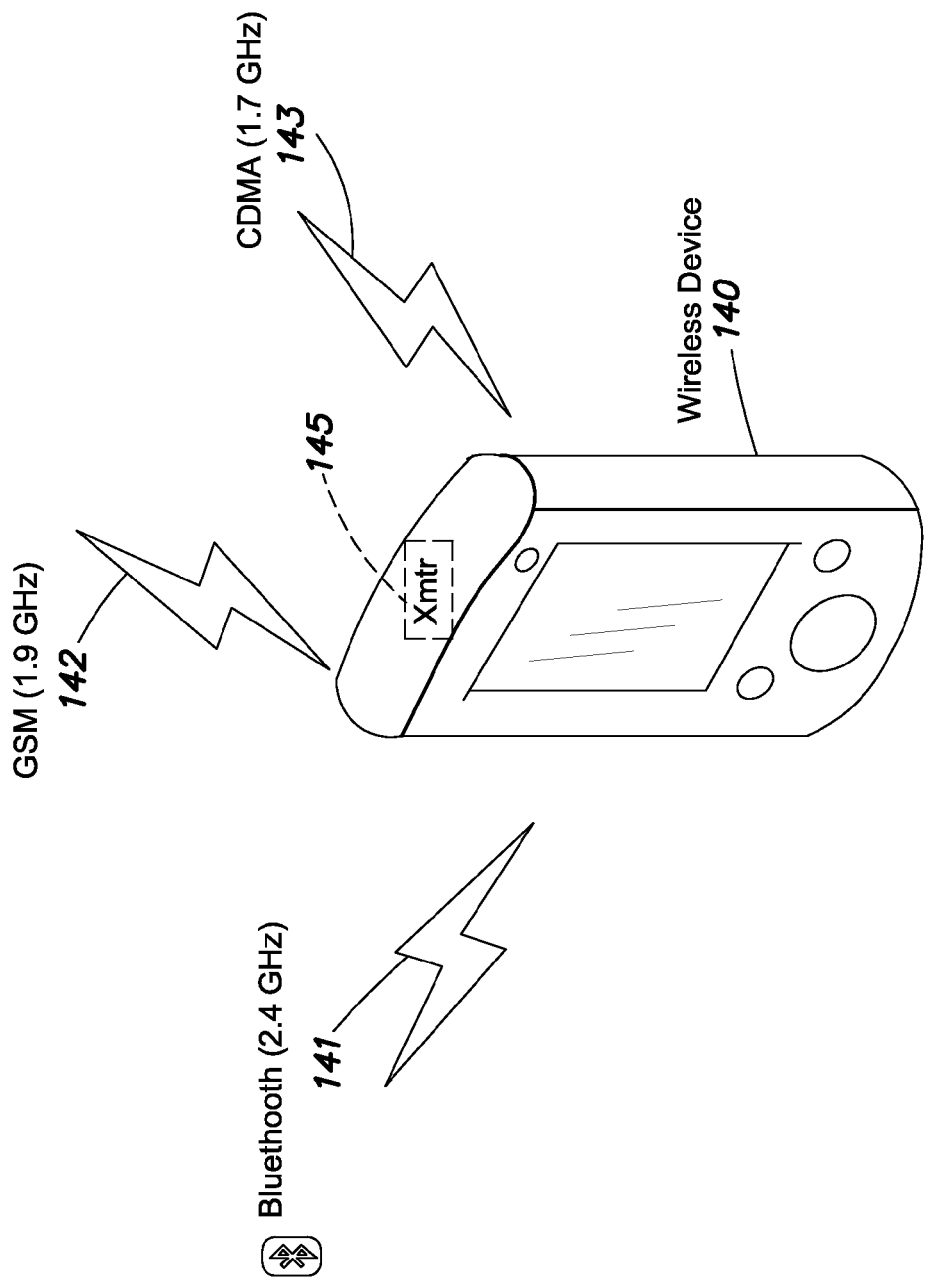
FIG. 1B illustrates a wireless communication device including a wireless receiver to receive multiple signals (e.g., Bluetooth, GSM, CDMA) across a relatively wide bandwidth of GHz spectrum, according to one embodiment of the present invention.

Following below are more detailed descriptions of various concepts related to, and embodiments of, inventive methods and apparatus for monitoring occupancy of wideband GHz spectrum, and sensing (and in some instances decoding) respective frequency components of time-varying signals using sub-Nyquist criterion signal sampling. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. INTRODUCTION

Various embodiments of the present invention are directed to a conceptual framework (or "technology") referred to herein generally as "BigBand," which in various aspects is implemented in multiple methods, apparatus, and systems described in detail herein relating to wideband spectrum sensing (e.g., detecting occupied bands within a wide GHz spectrum). As noted above, this conceptual framework is referred to herein as "BigBand." In some embodiments disclosed herein, systems, apparatus and methods based on the BigBand conceptual framework not only are capable of detecting occupancy of one or more bands of a wideband spectrum, but may further be configured to decode sensed signals in occupied bands so as to obtain the information carried by these signals (e.g., obtaining in-phase I and quadrature Q components of an encoded signal).

BigBand generally builds on advances in the research area of sparse Fourier transforms, which permit signals whose frequency domain representation is sparse to be recovered using only a relatively small subset of signal samples (also referred to herein as "sub-sampling"), such that GHz of spectrum can be effectively analyzed for occupancy by sampling signals representing the wideband spectrum at sampling rates below their Nyquist rate. In some examples discussed in greater detail below, the disclosed methods, apparatus and systems based on BigBand may be implemented by modifying conventional relatively low-power wireless RF receivers (e.g., configured for reception of signals in the GHz bandwidth) and using off-the-shelf relatively inexpensive low-speed and low-power analog-to-digital converters (ADCs) typically employed in WiFi devices or cellular phones, thereby facilitating practical implementation of effective wideband sensing techniques at relatively low cost.

Some past work relating to GHz spectrum sensing has proposed using compressive sensing to acquire GHz signals at sub-Nyquist sampling rates. Approaches based on compressive sensing require random sampling of the signal, which in turn requires analog mixing at Nyquist rates and expensive processing to recover the original signal (e.g., such random sampling cannot be done simply by using conventional low-speed/low cost ADCs). These designs are relatively complex and arguably consume as much power as an ADC that would sample at the Nyquist rate. Unlike compressive sensing, various implementations of methods, apparatus and systems based on BigBand do not require analog mixing or random sampling and can be implemented using conventional wireless RF receivers (e.g., "commodity radios"), conventional relatively low-speed low-power and low-cost ADCs, and innovative Fast Fourier Transform (FFT) techniques that facilitate increased processing and computational speeds based at least in part on concepts relating to sub-sampling.

In one exemplary implementation of a system based on the conceptual framework of BigBand, multiple software radio devices (commonly known as USRPs or Universal Software Radio Peripherals) are employed with conventional relatively low-speed, low-cost, low-power ADCs and one or more processors to implement novel sparse FFT (sFFT) algorithms that enable wideband GHz sensing. More specifically, one illustrative prototype discussed in greater detail below employs three USRPs, each of which can capture 50 MHz bandwidth, as constituent components of a system that is capable of wideband sensing across a bandwidth of almost 1 GHz; i.e., a sensing bandwidth that is six times larger than the digital bandwidth of the three USRPs combined. In one particular example, a system is constructed to sense the spectrum between 2 GHz and 2.9 GHz (a 0.9 GHz swath of spectrum used by diverse technologies). Outdoor measurements reveal that, in geographic areas with relatively dense populations (e.g., a metropolitan area or a university campus), this swath of spectrum presently has a typical occupancy of approximately 2-5%. Under these conditions, the exemplary wideband sensing system described herein in one implementation is capable not only of wideband sensing but also decoding (e.g., recovering information from) signals from up to 30 transmitters that are simultaneously frequency hopping in the monitored 0.9 GHz band.

In other implementations, methods, apparatus and systems based on the conceptual framework of BigBand may effectively perform spectrum sensing even in more densely occupied spectrum. The efficacy of BigBand to sense more densely occupied spectrum is predicated in part on the notion that only a small fraction of the spectrum is likely to change its occupancy over short intervals of a few milliseconds. Evaluation of such methods, apparatus and systems demonstrate effective detection of particular frequency bands in the wideband spectrum that change occupancy even when the spectrum is 95% occupied.

II. OVERVIEW

Figure 2A:
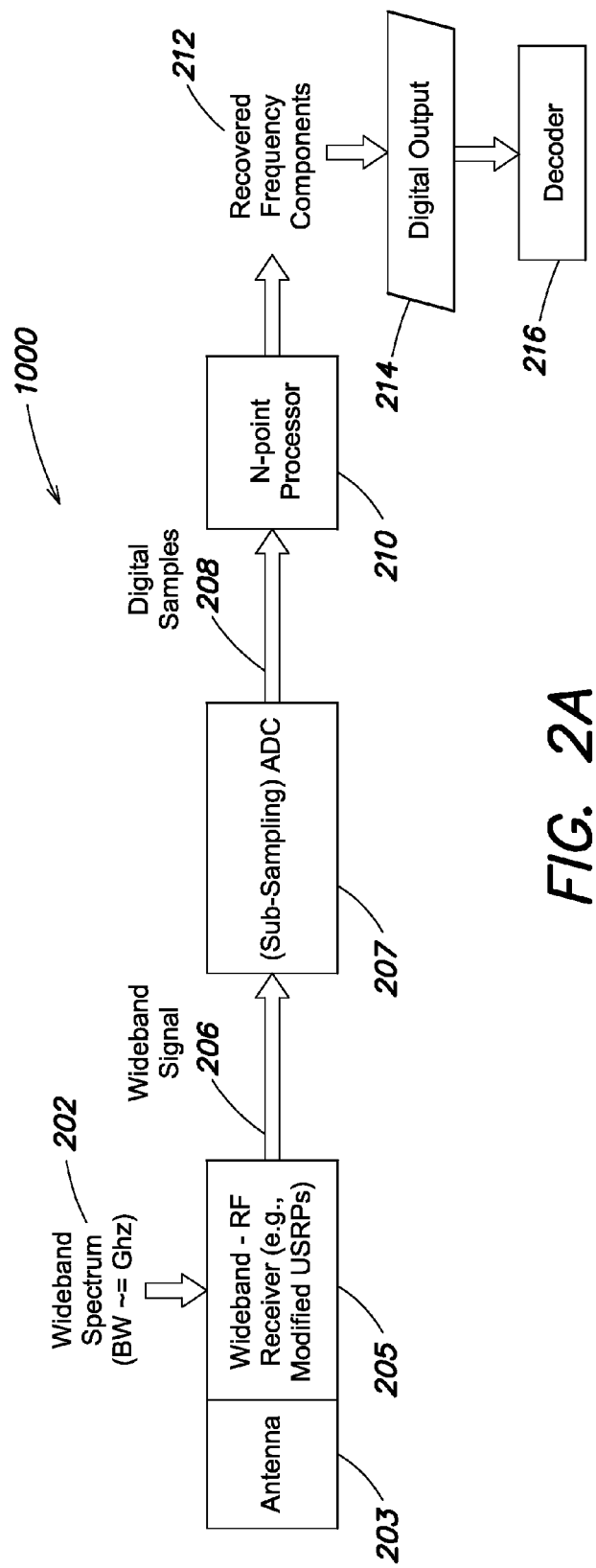
FIGS. 2A-2B show block diagrams illustrating systems including a wideband RF GHz receiver to monitor a wideband spectrum in the GHz range and output a corresponding wideband signal, an analog-to-digital converter (ADC) apparatus employing sub-Nyquist criterion signal sampling to sample the wideband signal output by the wideband receiver, and a sparse Fast Fourier Transform (sFFT) processor for sensing respective frequency components of the wideband signal corresponding to the monitored spectrum, according to embodiments of the present invention.

FIG. 2A illustrates a block diagram of a system 1000 for monitoring a wideband spectrum in the GHz range, and sensing respective frequency components of a wideband signal corresponding to the monitored wideband spectrum, according to one embodiment of the present invention. As shown in FIG. 2A, the system 1000 includes a wideband RF receiver 205 and an associated antenna 203 to monitor a wideband spectrum 202 over a GHz bandwidth and output a time-varying wideband signal 206 corresponding to the monitored spectrum 202. In one example implementation discussed in greater detail below, the wideband receiver 205 may comprise one or more Universal Software Radio Peripherals (USRPs). As discussed elsewhere herein, in some embodiments the monitored spectrum 202 and the corresponding time-varying wideband signal 206 may be "sparse" in that non-zero frequency components present in the monitored spectrum 202 (and hence the signal 206) are sparsely distributed across the spectrum (as illustrated, for example in FIG. 1A).

In the system of FIG. 2A, the time-varying wideband signal 206 is sampled by an analog-to-digital converter (ADC) apparatus 207 that employs sub-Nyquist criterion signal sampling to sample the wideband signal 206. For purposes of the present disclosure, a "sample" of a signal refers to a complex sample including both in-phase I and quadrature Q components (thus, the Nyquist criterion implies that a bandwidth of interest of BW Hz requires BW complex samples per second, i.e., real and imaginary samples). The ADC apparatus 207 provides as an output digital samples 208 of the time-varying wideband signal 206, which are then processed by a Fast Fourier Transform (FFT) processing apparatus 210. In various embodiments, the FFT processing apparatus includes one or more sparse Fast Fourier Transform (sFFT) processors to recover (e.g., provide information about the presence of) respective frequency components 212 of the time-varying signal 206 corresponding to the monitored spectrum 202, based on the processed digital samples 208.

In various embodiments, the FFT processing apparatus 210 provides a digital output 214 that includes information pertaining to the frequency of each detected frequency component of the frequency components 212. For example, in some implementations the digital output 214 includes a frequency index or position for each detected frequency component, and a corresponding complex magnitude and phase of each detected frequency component (also referred to as a "complex value" of a given frequency component). In some embodiments, at least some of the information in the digital output 214 pertaining to sensed frequency components may be provided as an N-bit digital word representing the frequency components 212 that are present in the time-varying signal 206 corresponding to the monitored GHz bandwidth (e.g., each bit representing whether a respective frequency component is occupied or not). In an alternative implementation, the FFT processing apparatus can provide an output having a number of bits equal to $\log_2(N)$ multiplied by a number of the sensed one or more occupied (non-zero) frequency components; in this way, the output represents all the occupied frequencies. In a further implementation, as in wireless communication the occupied frequencies regions can be consecutive, the FFT processing apparatus can use the beginning frequency and the ending frequency of each occupied frequency region to represent the sensed one or more occupied frequency regions; in this way, the number of output bits equals $2 \times \log_2(N)$ multiplied by a number of occupied frequency regions.

Once the frequency components 212 that are present in the monitored spectrum are identified by the FFT processing apparatus 210, in some embodiments the decoder 216 can process one or more sensed frequency components by taking an inverse FFT (IFFT) based on the complex values (i.e., complex magnitude and phase) associated with the one or more frequency components so as to recover the original time-domain signal corresponding to the frequency component(s). Subsequently, the decoder 216 decodes the recovered time-domain signal output by the IFFT (e.g., according to any of a number of well-known communication protocols) to facilitate recovery of information (e.g., digital symbols) originally encoded on the time-domain signal at a transmitting source.

In various implementations, decoding of one or more of the respective sensed frequency components in the monitored bandwidth presumes some knowledge of the original time-domain signals generated at the transmitting source (e.g., encoding protocol/modulation methodology used to encode information on one or more carriers to generate the respective original time-domain signals, respective bandwidths of the original time-domain signals, etc.). Decoding also takes into consideration the size/resolution of the FFT (e.g., N-points) implemented by the FFT processing apparatus 210 as compared to the respective bandwidths of the original time-domain signals; for example, given an N-point FFT (with frequency number positions or indices $f_i$, $i=0, 1, 2, \ldots N-1$), the bandwidth of an original time-domain signal at the transmitting source may be such that it corresponds to one sensed frequency position of the N-point FFT or multiple (e.g., adjacent) sensed frequency positions of the N-point FFT. Thus, the IFFT employed by the decoder 216 to recover a time-domain signal from one or more sensed frequency components (based on the complex magnitude and phase associated therewith) should be taken over a bandwidth comparable to the expected bandwidth of the time-domain signal.

Figure 2B:
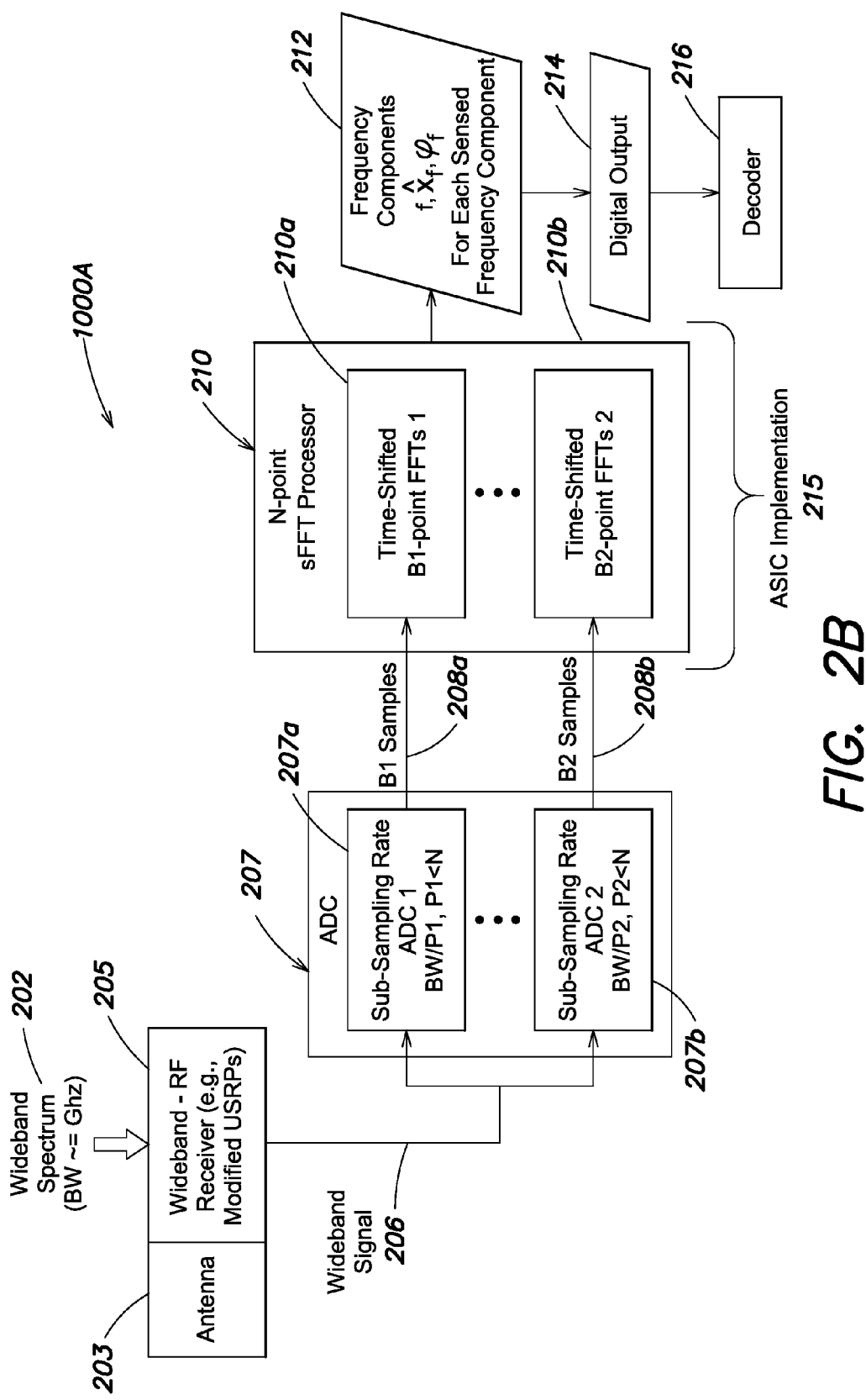

FIG. 2B is an expanded block diagram similar to that shown in FIG. 2A and illustrating in greater detail the respective components of a system 1000A for monitoring a wideband spectrum in the GHz range, and sensing respective frequency components of a wideband signal corresponding to the monitored wideband spectrum, according to one embodiment of the present invention. In the block diagram of FIG. 2B, additional details of an ADC apparatus 207 and an FFT processing apparatus 210 are shown to illustrate the concepts of time-shifting of the time-varying signal representing the monitored wideband spectrum and co-prime sub-sampling of the wideband signal 206 to facilitate an identification of the frequency components 212 that are present in the time-varying signal 206 corresponding to the monitored GHz bandwidth spectrum. As discussed in greater detail below in connection with FIG. 2C, the respective elements of the ADC apparatus 207 and the FFT processing apparatus 210 in the system 1000A may employ uniform sub-sampling of the time-varying signal 206 in the time domain to facilitate a technique referred to herein as "bucketization" in the frequency domain. Signal sub-sampling and corresponding "bucketization" allows smaller-sized FFTs to be employed by the FFT processing apparatus 210, which may facilitate increased processing speeds, reduce circuit footprint and/or required processing power, and reduce fabrication overhead and costs associated with the FFT processing apparatus.

Although signal sub-sampling allows for smaller-sized FFTs, one tradeoff is that signal sub-sampling in the time domain may give rise to a concept referred to herein as "frequency collision" in the frequency domain. The Inventors have recognized and appreciated, however, that using multiple ADCs with different co-prime sub-sampling rates to sample the time-varying signal 206 in the ADC apparatus 207 serves to mitigate "frequency collision" that may arise from sub-sampling in the time domain. Accordingly, in some embodiments the system 1000A also may employ co-prime sub-sampling techniques for the ADC apparatus 207 to facilitate an inventive technique referred to herein as "collision resolution." The system 1000A also may employ time-shifting of the time-varying signal representing the monitored spectrum to facilitate frequency estimation of frequency components that are present in the time-varying signal 206, based on phase rotation in the frequency domain. These various inventive concepts are discussed in greater detail further below.

In the systems shown in FIGS. 2A and 2B, consider that the wideband time-varying signal 206 may have a frequency bandwidth of interest BW and a Nyquist sampling criteria of N samples in a sampling time T, wherein $N=T \times BW$. With the foregoing in mind, as shown in FIG. 2B, the signal 206 may be uniformly sub-sampled by a plurality of different ADCs of the ADC apparatus 207 with different sample rates so as to implement aliasing filters resulting in "bucketization." In particular, a first ADC 207a of the ADC apparatus 207 may have a first sub-sampling rate of $BW/p_1$ samples per second, wherein $p_1$ is less than N so as to provide a first set of $B_1 = N/p_1$ sub-sampled digital samples 208a of the time-varying signal 206. Similarly, a second ADC 207b of the ADC apparatus 207 may have a second sub-sampling rate of $BW/p_2$ samples per second, wherein $p_2$ is less than N so as to provide a first set of $B_2=N/p_2$ sub-sampled digital samples 208b of the time-varying signal 206. This manner of sub-sampling of the time-varying signal 206 allows FFTs having a size smaller than N points to be employed to recover respective frequency components of the time-varying signal 206. In particular, as shown in FIG. 2B, a $B_1$-point FFT 210a of the FFT processing apparatus 210 may be used to process the $B_1$ digital samples 208a, and a $B_2$-point FFT 210b of the FFT processing apparatus 210 may be used to process the $B_2$ digital samples 208b.

Figure 2C:
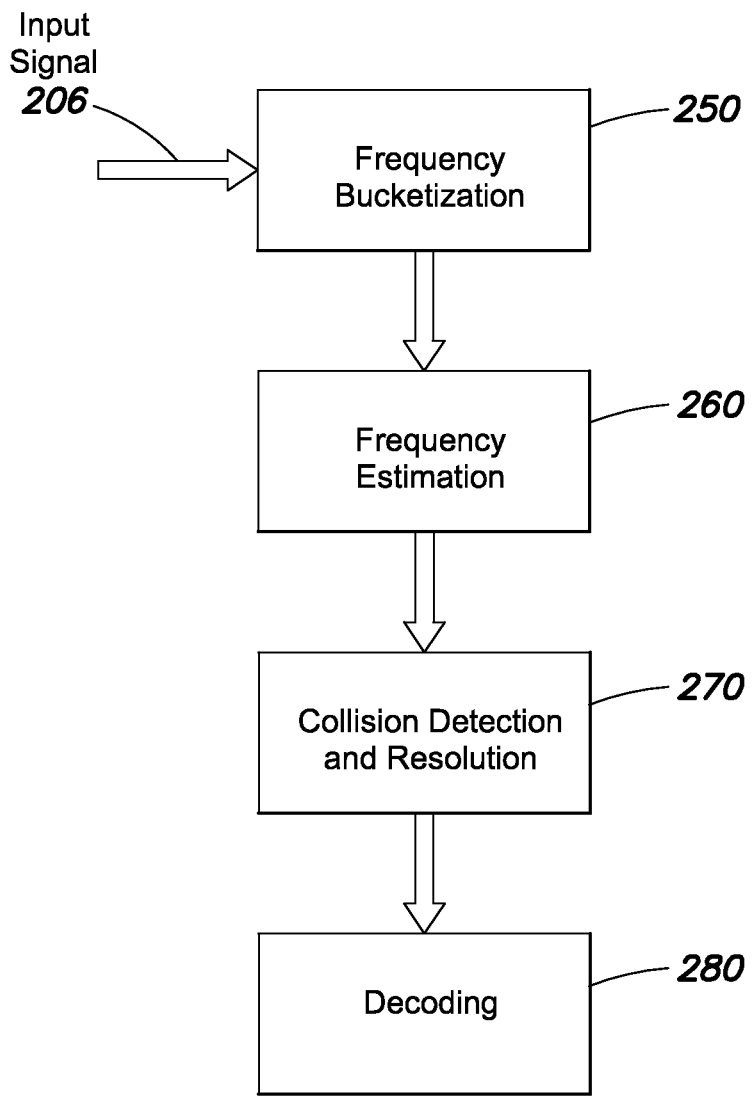
FIG. 2C shows a flow diagram illustrating a wideband spectrum sensing method based on the block diagrams of the systems shown in FIG. 2A and FIG. 2B, according to one embodiment of the present invention.
Figure 3A:
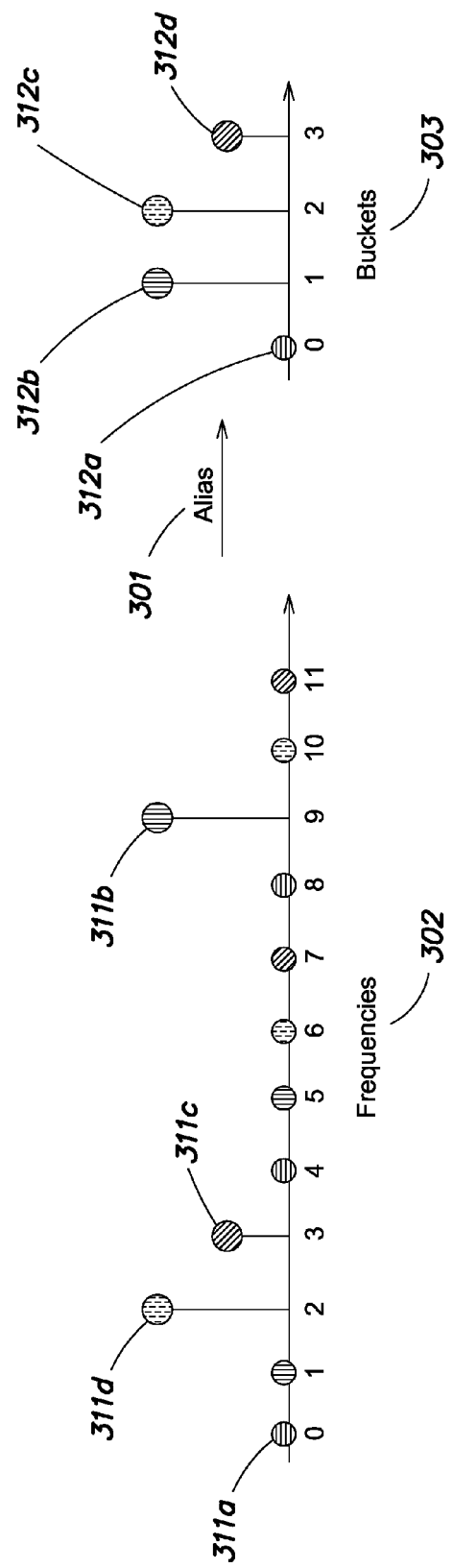
FIG. 3A shows a processing technique used in the method of FIG. 2C referred to as "bucketization" using one or more aliasing filters implemented in part by the ADC apparatus of FIG. 2A or FIG. 2B, according to one embodiment of the present invention.
Figure 3B:
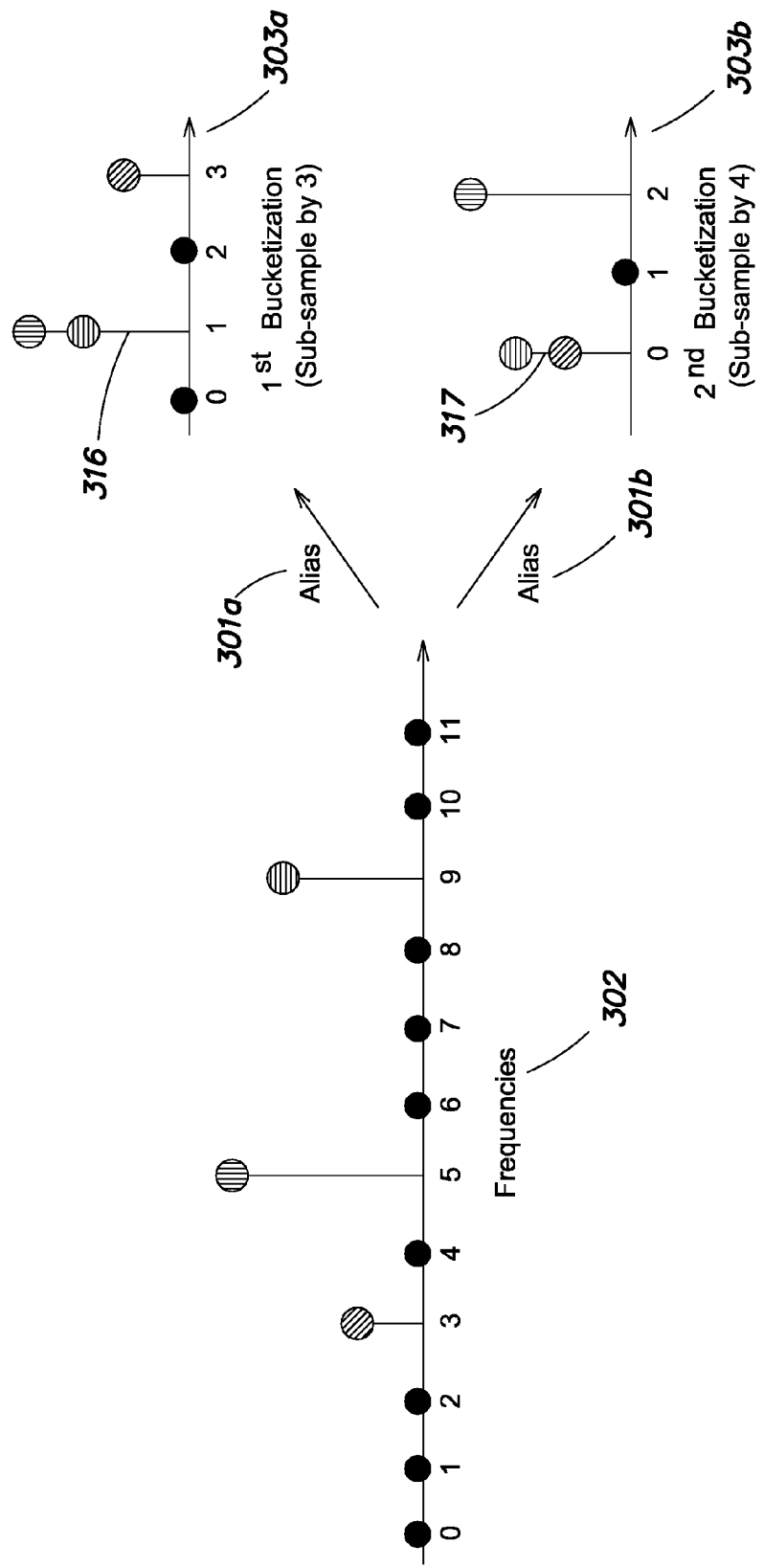
FIG. 3B shows another processing technique used in the method of FIG. 2C relating to resolving collisions with co-prime aliasing filters implemented in part by the ADC apparatus of FIG. 2A or FIG. 2B, according to one embodiment of the present invention.

As noted above, the sub-sampling of the signal 206 causes aliasing in the frequency domain, such that when the respective sub-sampled digital samples are processed by corresponding sFFT processors of the FFT processing apparatus 210, multiple frequency components present in the signal 206 may "hash" to a same frequency "bucket," leading to a "frequency collision." To mitigate such frequency collision, in some embodiments the numbers $p_1$ and $p_2$ are selected to be co-prime numbers so as to facilitate "collision resolution." These concepts are discussed in greater detail below in connection with FIGS. 2C, 3A and 3B. As also noted above, time-shifting in the time domain (e.g., of the time-varying signal input to the ADC apparatus 207) facilitates frequency position estimation of frequency components that are present in the time-varying signal 206, based on phase rotation in the frequency domain. To this end, the ADC apparatus 207 may include multiple ADCs at each of the different sampling rates $BW/p_1$ and $BW/p_2$ (these other ADCs are not shown explicitly in FIG. 2B), and the FFT processing apparatus 210 may include multiple $B_1$-point sFFTs and $B_2$-point sFFTs (not explicitly shown in FIG. 2B) respectively coupled to corresponding ones of the time-shifting ADCs of the ADC apparatus 207. In this manner, multiple time-shifted sub-sampled sets of digital samples of the time-varying signal 206 are respectively processed by corresponding $B_1$-point sFFTs or $B_2$-point sFFTs of the FFT processing apparatus 210 so as to provide the digital output 214 representing the sensed frequency components 212 that are present in the time-varying signal 206 corresponding to the monitored spectrum. As noted above in connection with FIG. 2A, once the sensed frequency components 212 are identified, respective frequency components may be decoded via decoder 216.

FIG. 2C shows a flow diagram illustrating a wideband spectrum sensing method based on the block diagrams of the systems shown in FIG. 2A and FIG. 2B, according to one embodiment of the present invention, in which the time-varying signal 206 is processed by the ADC apparatus 207 and the FFT processing apparatus 210 to implement frequency bucketization 250, frequency estimation 260, and collision detection and resolution 270. Respective frequency components that are detected in the monitored spectrum as a result of the method involving blocks 250-270 may be further processed in some embodiments in decoding block 280 (e.g., by decoder 216 shown in FIGS. 2A and 2B) so as to recover information encoded on one or more sensed frequency components (e.g., in the form of a time-domain signal). These inventive techniques outlined in blocks 250-270 of FIG. 2C are discussed in turn below.

III. CONCEPTUAL DETAILS

For purposes of the present discussion, the symbols x and $\hat{x}$ are used herein to denote a time signal and its Fourier transform respectively. The following terms are also used throughout this application: the position of a sensed frequency component in the monitored spectrum given by f (also referred to herein as frequency position number or index), the value of a sensed frequency component given by $\hat{x}_f$, and the phase of a sensed frequency component ($\phi_f$) (the value and phase of a frequency component are also referred to as the "complex value" of the frequency component). As shown in FIGS. 2A-B, a system based on BigBand monitors wideband spectrum 202, processes a signal 206 corresponding to the monitored spectrum, and discovers the occupied frequency positions f of one or more frequency components of the processed signal and estimates their corresponding values $\hat{x}_f$ and phase $\phi_f$. Once $\hat{x}$ is computed (e.g., $\hat{x}_f$, $\phi_f$ and f are computed for all components present), the time signal x can be recovered via inverse FFT (IFFT). Subsequently, information encoded on the respective sensed frequency components (e.g., "wireless symbols" encoded on carriers using any of a variety of protocols) may be decoded so as to recover the information.

With reference to FIG. 2C, BigBand's design essentially has three primary components: frequency bucketization 250, frequency estimation 260, and collision detection and resolution 270, which are described in turn below. Further details of Big-Band can be found in H. Hassanieh, L. Shi, O. Abari, E. Hamed, and D. Katabi, "BigBand: GHz-Wide Sensing and Decoding on Commodity Radios," May 2013, MIT-CSAIL-TR-2013-009; and the complete analysis of the algorithm and proofs of correctness can be found in B. Ghazi, H. Hassanieh, P. Indyk, D. Katabi, E. Price, and L. Shi, "Sample-Optimal Average-Case Sparse Fourier Transform in Two Dimensions," *Proceedings of Allerton Conference*, October 2013, both of which publications are herein expressly incorporated by reference.

With respect to frequency bucketization 250, in various embodiments BigBand performs bucketization by sub-sampling in the time domain then taking an FFT, which causes aliasing in the frequency domain. This process essentially maps the spectrum ("hashes" respective frequency components present in the monitored spectrum) into "buckets," as illustrated and discussed further below in connection with FIGS. 3A and 3B. Since in some implementations the monitored spectrum is sparsely occupied, most buckets will be either empty or have a single active frequency, and only few buckets will have a collision of multiple active frequencies. Empty buckets are discarded and non-empty buckets undergo the technique of "frequency estimation."

Regarding frequency estimation 260, the value and frequency number (i.e., location in the spectrum) of each active frequency are estimated based on time-shifts in the time domain that correspond to phase rotation in the frequency domain. In the absence of a collision, the value $\hat{x}_f$ of an active frequency is the value of its bucket. To find the frequency position number f, in one implementation BigBand repeats the bucketization on the time-varying signal after shifting it in time. A shift in time causes a phase change $\Delta\phi_f$ in the frequency domain of $2\pi f\tau/N$, where f is the frequency number, $\tau$ is the time shift (e.g., in units of some number of shifted samples out of a total of N samples), and N is the FFT size. Thus, the phase change can be used to compute the frequency number.

With respect to collision resolution 270, in various embodiments collisions are detected as follows: if a bucket contains a collision then repeating the bucketization with a time shift causes the bucket's magnitude to change, since the colliding frequencies rotate by different phases. In contrast, the magnitude does not change if the bucket has a single active frequency. After detecting collisions, the BigBand resolves them by using bucketization multiple times with co-prime sampling rates and corresponding sFFTs with co-prime sizes (two numbers are co-prime if their greatest common divisor is one). The use of co-prime sampling rates guarantees that any two frequencies that collide in one bucketization do not collide in other bucketizations (as shown and discussed further below in connection with FIG. 3B).

A. Frequency Bucketization

To hash frequencies into buckets, BigBand may utilize the following basic property of the Fourier transform: sub-sampling in the time domain causes aliasing in the frequency domain. Stated differently, aliasing in the frequency domain is accomplished by sampling the signal in the time domain at a sampling rate that is lower than the Nyquist rate for the signal.

Formally, let x be a time signal of bandwidth BW, and $\hat{x}$ its frequency representation. Let b be a sub-sampled version of x, i.e., $b_i = x_{i \cdot p}$ where p is the sub-sampling factor. Then, $\hat{b}$, the FFT of b is an aliased version of $\hat{x}$, i.e.:

$$\hat{b}_i = \sum_{m=0}^{p-1} \hat{x}_{i+m(BW/p)}. \qquad (1)$$

Thus, an aliasing filter is a form of bucketization in which frequencies equally spaced by an interval BW/p hash to the same bucket, i.e., frequency f hashes to bucket i=f mod BW/p, as shown in FIG. 3A. FIG. 3A shows an example of a bucketization of a time-varying signal where N is taken to be 12 for purposes of illustration (such that there are twelve frequency points 302 for the FFT of the signal). The bucketization is achieved using an aliasing filter 301 (e.g., constituted by an ADC of the ADC apparatus 207 and a corresponding sFFT of the FFT processing apparatus 210). In the present illustrative example, an ADC of the ADC apparatus 207 is configured to sub-sample the input time-varying signal by 3× in the time domain, resulting in the spectrum aliasing into only four buckets 303 in the frequency domain upon processing of the digital samples output by the ADC by the corresponding sFFT of the FFT processing apparatus). Thus, the twelve frequency points 302 (e.g., see frequency position numbers 0 through 11 on the left side of FIG. 3A) will alias into only four frequency buckets 303 (shown on the right side of FIG. 3A); stated differently, frequency components that are present in the sub-sampled time-varying signal and that are equally spaced by four frequency positions amongst the twelve frequency points 302 end up in the same bucket of the four frequency buckets 303 after processing by the ADC and corresponding sFFT constituting the aliasing filter 301.

More specifically, in FIG. 3A, frequency components present in frequency position numbers 0, 4, 8 of the frequencies 302 hash to the same first bucket 312a of the buckets 303. Similarly frequency components present in frequency position numbers 1, 5, 9 of the frequencies 302 hash to the same second bucket 312b; frequency components present in frequency position numbers 2, 6, 10 of the frequencies 302 hash to the same third bucket 312c; and frequency components present in frequency position numbers 3, 7, 11 of the frequencies 302 hash to the same fourth bucket 312d.

Further, the value in each bucket of the buckets 303 is the sum of the values of only the frequency components that hash to the bucket as shown in Eq. 1. For example, for bucket 312a, the value is equivalent to the sum of the values of frequency numbers 0, 4 and 8 (which is zero in the present example); the value of bucket 312b is equivalent to the sum of values of frequency numbers 1, 5 and 9 (which is only the value 311b of frequency number 9 in the present example); the value of bucket 312c is equivalent to the sum of values of frequency numbers 2, 6 and 10 (which is only the value 311d of frequency number 2 in the present example); and the value of bucket 312d is equivalent to the sum of values of frequency numbers 3, 7 and 11 (which is only the value 311c of frequency number 3 in the present example).

Although N=12 frequency points were considered in the example of FIG. 3A for purposes of illustrating the concept of bucketization, it should be appreciated that in various implementations of inventive methods and apparatus according to various embodiments disclosed herein, N may be a significantly larger number given the wideband spectrum of interest, and this spectrum of interest (and the corresponding time-varying wideband signal corresponding to the monitored spectrum) may be relatively sparse. Accordingly, when the respective frequency components present in the monitored spectrum and corresponding time-varying wideband signal are hashed into buckets according to the bucketization technique described herein, the fact that the spectrum of interest is sparse and hence most buckets have noise and no signal may be leveraged. To this end, BigBand compares the energy (i.e., the magnitude square) of a bucket with the wideband receiver's noise level and considers all buckets whose energy is below a threshold to be empty. It then focuses on the occupied buckets and ignores empty buckets.

B. Frequency Estimation

Next, for each of the occupied buckets, BigBand may identify which frequency components created the energy in these buckets, and what are the values of these frequency components. By doing so, BigBand can recovered a complete representation of the frequency components with non-zero signal values so as to "acquire" the full signal in the Fourier domain. In this manner, BigBand can essentially provide a full N-point FFT of a time-varying signal having a bandwidth of interest BW and a Nyquist sampling criteria of N samples in a sampling time T, wherein N=T×BW, by using smaller $B_1$-point and $B_2$-point FFTs (i.e., wherein $B_1 = N/p_1$ and $B_2 = N/p_2$).

As noted above, presuming a relatively sparse spectrum, when hashing frequencies into buckets many buckets are likely to be empty. Even for the occupied buckets, the sparsity of the spectrum means that many of these buckets will likely have a single non-zero frequency hashing into them, and only a small number of buckets will have a collision of multiple non-zero (or occupied) frequencies. In one aspect, BigBand may first focus on buckets with a single non-zero frequency and estimate the value and the position of this non-zero frequency, i.e., $\hat{x}_f$ and the corresponding frequency position f.

In the absence of a collision, the value of the occupied frequency is the value of the bucket. Said differently, the value of a bucket after aliasing $\hat{b}_i$ is a good estimate of the value of the occupied frequency $\hat{x}_f$ in that bucket, since all other frequencies in the bucket have zero signal value (only noise).

Although the value of the non-zero frequency in a bucket can be found, its frequency position f may not be known, since aliasing mapped multiple frequencies to the same bucket. To compute f, the phase-rotation property of the Fourier transform can be leveraged, which states that a shift in time domain translates into phase rotation in the frequency domain. Specifically, to accomplish frequency estimation, the process of bucketization is performed again (e.g., with another aliasing filter constituted by an ADC of the ADC apparatus 207 and a corresponding sFFT of the FFT processing apparatus 210), after shifting the input signal by some amount of time that corresponds to a time shift τ (e.g., in units of some number of shifted samples out of a total of N samples). Since a shift in time translates into phase rotation in the frequency domain, the value of the bucket changes from $\hat{b}_i = \hat{x}_f$ to $\hat{b}_i^{(\tau)} = \hat{x}_f e^{2\pi j f \tau / N}$. Hence, using the change in the phase of the bucket, the frequency of interest can be estimated, which can be performed for all buckets that do not have collisions.

In various aspects, it should be appreciated that not all values of τ will allow unique estimation of multiple frequency positions. This is because the phase wraps around every $2\pi$. For example, say that we use a shift of $\tau=2$ samples out of N where N is the size of the FFT, and consider two frequencies f and f'=f+N/2. After a shift by $\tau$, the phase rotation of f is $\Delta\phi(f)=2\pi\cdot f\cdot 2/N$. The phase rotation of f' is $\Delta\phi(f\_)=2\pi\cdot(f+N/2)\cdot 2/N \mod 2\pi=2\pi\cdot f\cdot 2/N$. Thus, with a time shift of 2 samples, the phase shifts observed for two frequencies f and f' separated by N/2 are the same, and BigBand will be unable to disambiguate between them. BigBand can use a shift of $\tau=3$ samples to disambiguate between f and f+N/2, but this does not address the situation completely since a shift of $\tau=3$ will be unable to disambiguate frequencies separated by N/3. In general, a $\tau$ should be considered that gives a unique mapping between the phase rotation and the frequencies, independent of the separation between the frequencies. Formally, for all separations s between the frequencies ($1 \leq s \leq N-1$), $s\tau/N$ should not be an integer. This is true either $\tau=1$ sample (e.g., corresponding to a time delay of the time-varying signal of 1/BW where BW is the bandwidth of interest), or any $\tau$ invertible modulo N. To sample the time-delayed signal, a second low-speed ADC may be used that has the same sampling rate as the ADC in the bucketization step but that receives a delayed version of the time-varying signal, i.e., delayed by some time corresponding to some number of sample shifts $\tau$. In some example implementations, this can be achieved by connecting a single antenna to two ADCs of the ADC apparatus 207 using different delay lines. Alternatively, one can use different delay lines to connect the clocks to the two ADCs of the ADC apparatus 207.

C. Collision Detection and Resolution

BigBand also uses the phase rotation property of the Fourier transform to determine if a collision has occurred. Specifically, if the bucket contains a single non-zero frequency, i.e., no collision, then performing the bucketization with a time shift $\tau$ causes only a phase rotation of the value in the bucket but the magnitude of the bucket does not change (i.e., with or without the time shift, $\|\hat{b}_i\|=\|\hat{b}_i^{(\tau)}\|=\|\hat{x}_f\|$). In contrast, consider the case where there is a collision between, say, two frequencies f and f'. Then the value of the bucket without a time-shift is $\hat{b}_i=\hat{x}_f+\hat{x}_{f'}$ while its value with a time-shift of $\tau$ is $\hat{b}_i^{(\tau)}=\hat{x}_f\cdot e^{2\pi j f\tau}$. Since the colliding frequencies rotate by different phases, the overall magnitude of the bucket will change. Thus, it can be determined whether there is a collision or not by comparing the magnitudes of the buckets with and without the time-shift. It should be noted that even if a collision is occasionally falsely detected when there is a single frequency, BigBand can still correct this error. This is because the collision resolution step described below estimates the values of the presumed colliding frequencies to zero.

To reconstruct the full spectrum, the collisions are to be solved; i.e., for each non-zero frequency in a collision its value $\hat{x}_f$ and position f need to be estimated. Two approaches may be adopted for resolving collisions (which may also be combined in case the spectrum is less sparse), as set for the below.

One approach to resolve collisions is to bucketize the spectrum multiple times using aliasing filters with co-prime sampling rates. Co-prime aliasing filters guarantee (by the Chinese remainder theorem) that any two frequencies that collide in one bucketization will not collide in the other bucketizations. To better understand this point, consider the example in FIG. 3B, which shows an example of resolving collisions by using two co-prime aliasing filters to ensure the frequencies that collide in one filter will not collide in the second.

The illustration in FIG. 3B, like FIG. 3A, again considers an example in which N is taken to be 12 for purposes of illustration (such that there are twelve frequency points 302 for the FFT of the signal). In the example of FIG. 3B, the twelve frequency points 302 on the left side of the figure reveal that, for the monitored wideband spectrum and corresponding time-varying wideband signal in the current example, there are frequency components present in frequency position numbers 3, 5, and 9. Two bucketizations are performed on the time-varying signal, using a first aliasing filter 301a (e.g., constituted by a first ADC of the ADC apparatus 207 and a corresponding first sFFT of the FFT processing apparatus 210) and a second aliasing filter 301b (e.g., constituted by a second ADC of the ADC apparatus 207 and a corresponding second sFFT of the FFT processing apparatus 210).

To implement the first aliasing filter 301a of two co-prime aliasing filters, the first ADC of the ADC apparatus 207 is configured to sub-sample the input time-varying signal by $3\times$ in the time domain, resulting in the spectrum aliasing into only four buckets 303a in the frequency domain upon processing of the digital samples output by the first ADC by the corresponding first sFFT of the FFT processing apparatus. Thus, the twelve frequency points 302 (e.g., see frequency position numbers 0 through 11 on the left side of FIG. 3B) alias into only four frequency buckets 303a (shown on the top right side of FIG. 3B). Further, to implement the second aliasing filter 301b, the second ADC of the ADC apparatus 207 is configured to sub-sample the input time-varying signal by $4\times$ in the time domain, resulting in the spectrum aliasing into only three buckets 303b in the frequency domain upon processing of the digital samples output by the second ADC by the corresponding second sFFT of the FFT processing apparatus. Thus, the twelve frequency points 302 alias into only three frequency buckets 303b (shown on the bottom right side of FIG. 3B) in this second bucketization based on co-prime aliasing filters.

To illustrate the function of the co-prime aliasing filters, consider the frequency component in frequency position number 5 of the twelve frequency points 302 on the left side of FIG. 3B. By virtue of the first aliasing filter 301a, frequency position number 5 of the twelve frequency points hashes to bucket number 1 of the first set of buckets 303a arising from the first bucketization. But recall from the discussion above in connection with FIG. 3A that frequency position number 9 of the twelve frequency points also hashes to bucket number 1 of the first set of buckets 303a in the first bucketization; thus, frequency position numbers 5 and 9 collide in this first bucketization, giving rise to collision 316 shown in bucket number 1 of the first set of buckets 303a. It is also noteworthy that the frequency component in frequency position number 3 of the twelve frequency points 302 on the left side of FIG. 3B hashes to bucket number 3 of the first set of buckets 303a, without collision with any other frequency components.

Consider now the frequency component in frequency position number 5 of the twelve frequency points 302 as it undergoes a second bucketization by the second aliasing filter 301b. In this second bucketization, the frequency position number 5 hashes by itself to bucket 2 of the second set of buckets 303b without collision with any other frequency components. However, the frequency position numbers 3 and 9 both hash in this second bucketization to bucket 0 of the second set of buckets, giving rise to collision 317.

The respective collisions 316 (first bucketization) and 317 (second bucketization) can be solved by iterating between the two bucketizations. For example, the frequency 3 can be estimated from the first bucketization, where it does not collide. The frequency 3 is subtracted from the colliding bucket in the second bucketization to obtain the frequency 9. The first bucketization is revisited and then the frequency 9 is subtracted from the bucket where it collides to obtain the frequency 5.

Thus, by using co-prime aliasing filters to bucketize and iterating between the bucketizations (i.e., estimating frequencies from buckets where they do not collide and subtracting them from buckets where they do collide) the spectrum can be recovered. This process illustrates that to capture a spectrum bandwidth BW, two ADCs can be used that sample at rates $BW/p_1$ and $BW/p_2$ where $p_1$ and $p_2$ are co-prime. For example, to recover a 1 GHz spectrum, a 42 MHz ADC can be used along with a 50 MHz ADC. The combination of these two ADCs can capture a bandwidth of 1.05 GHz because 42 MHz=1.05 GHz/25 and 50 MHz=1.05 GHz/21, where 21 and 25 are co-prime numbers. Note that, as discussed further below, each of these co-prime bucketizations is repeated with a time shift, thereby requiring a total of 4 low-speed ADCs in the ADC converter apparatus 207 (and four corresponding sFFTs in the FFT processing apparatus 210).

Co-prime aliasing filters are an efficient way to resolve collisions, but in other embodiments they may not be necessary. Here, in an alternative implementation, collisions can be resolved while still using multiple ADCs of the ADC apparatus 207 that sample at the same rate (with implications that an ADC apparatus 207 in some inventive embodiments herein may be constructed with only one type of ADC). In this implementation, one type of aliasing filter is used multiple times with multiple different time shifts. To see how this can help resolve collisions, consider again the case where two frequencies f and f' collide in a bucket. If two time shifts $\tau_1$ and $\tau_2$ are used, three values are obtained for each bucket. For the bucket where f and f' collide, these values are:

$$\hat{b}_i = \hat{x}_f + \hat{x}_{f'}. \quad (2)$$
$$\hat{b}_i^{(T_1)} = \hat{x}_f e^{2\pi j f \tau_1} + \hat{x}_f x e^{22\pi j f' \tau_1}$$
$$\hat{b}_i^{(T_2)} = \hat{x}_f e^{2\pi j f \tau_2} + \hat{x}_f x e^{22\pi j f' \tau_2}$$

If the positions of f and f' are known, the above becomes an over determined system of equations where the only unknowns are $\hat{x}_f$, $\hat{x}'_f$. Since only few frequencies hash into each bucket, there is a limited number of possible values of f and f'. For each of these possibilities, the above over-determined system can be solved to find $\hat{x}_f$, $\hat{x}'_f$. Hence, the overdetermined system can be solved for the possible (f, f') pairs and choose the pair that minimizes the mean square error. While the above does not guarantee that the solution is unique, in case multiple pairs (ft) satisfy the equations, BigBand can detect that event and report that the values of these frequencies remain unresolved (note that theoretically, for a collision of k frequencies, 2 k samples can guarantee a unique solution in the absence of noise). The empirical results discussed further below show however that for practical spectrum sparsity (which is about 5%), three shifted bucketizations are enough to uniquely resolve the colliding frequencies.

Though this method requires more digital computation, BigBand performs this method for the few buckets that have a collision, and then obtains knowledge of the number of collisions, which could be small due to the sparsity of the spectrum.

In another implementation, this method can be combined with the co-prime approach to deal with less sparse spectrum. In this case, one uses this method to resolve collisions of two frequencies while iterating between the co-prime filters.

D. Channel Estimation and Calibration

The description above assumes that the different ADCs of the ADC apparatus 207 can sample exactly the same signal at different time-shifts. However, because the signals experience different channels, they will be scaled differently and the ADCs will not be able to sample exactly the same signal.

To better understand this problem, consider the case where collisions are solved without the co-prime sub-sampling. In this case, three ADCs can be used, each sampling a signal that is delayed by a time shift. In this case, consider a non-zero frequency f whose value is $\hat{x}_f$. If f hashes to bucket i and does not collide, then the value of the bucket at each of the ADCs can be written as:

$$\hat{b}_i = h_w(f) h_1(f) \hat{x}_f$$
$$\hat{b}_i^{(T_1)} = h_w(f) h_1(f) \hat{x}_f e^{2\pi j f \tau_1}$$
$$\hat{b}_i^{(T_2)} = h_w(f) h_1(f) \hat{x}_f e^{2\pi j f \tau_2} \quad (3)$$

where $h_w(f)$ is the channel on the wireless medium, $h_1(f)$, $h_2(f)$, $h_3(f)$ are the hardware channels on each of the radios, and •(f) indicates that these parameters are frequency dependent. $h_w(f)$ is the same in all three bucketizations by connecting the RF front ends (wireless receiver 205) to the same antenna. As a result, $h_w(f)$ cancels out once the ratios, $\hat{b}_i^{(r_1)}/\hat{b}_i$ and $\hat{b}_i^{(r_2)}/\hat{b}_i$ of the buckets are taken. However, the hardware channels are different for the different bucketizations. BigBand may need to estimate them and compensate for them in order to perform frequency estimation and also resolve the collisions.

Furthermore, though it is possible to create time-shifts between the three ADCs as explained above, the values of these time-shifts $\tau_1$, $\tau_2$ may be required in order to perform frequency estimation based on phase rotation. Embodiments of estimating these time-shifts are discussed below.

To estimate the channels and the time shifts, the total bandwidth BW is divided that BigBand captures into p consecutive chunks. Then a known signal is transmitted in each chunk, one by one. Since only one chunk is transmitted at a time, there are no collisions at the receiver after aliasing. Eq. 3 is used to estimate the ratios $h_2(f) \cdot e^{2\pi j f \tau_1}/h_1(f)$ and $h_3(f) \cdot e^{2\pi j f \tau_2}/h_1(f)$ for each frequency f in the spectrum.

Given the ratios, $h_2(f)/h_1(f)$ may be computed for each frequency f, and the delay $\tau_1$, which may be estimated as follows: both the magnitude and phase of the hardware channel ratio will be different for different frequencies. The magnitude differs with frequency because different frequencies experience different attenuation in the hardware. The phase varies linearly with frequency because all frequencies experience the same delay $\tau_1$, and the phase rotation of a frequency f is simply $2\pi f \tau_1$. The phase of the ratio may then be plotted as a function of frequency, and compute the delay $\tau_1$ from the slope of the resulting line.

Figure 4:
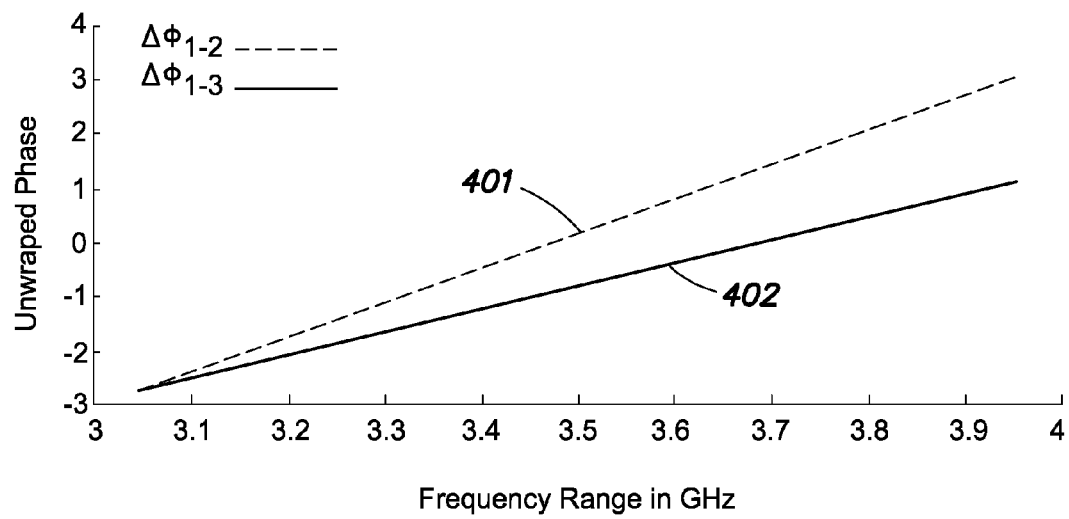
FIG. 4 illustrates the concept of phase rotation in the frequency domain based on time shifts in the time domain as part of the technique for resolving collisions illustrated in FIG. 3B, according to one embodiment of the present invention.

FIG. 4 shows the phase result of this estimation performed on a USRP software radios employed in one exemplary implementation of a wireless communication system according to one embodiment of the present invention. As shown in FIG. 4, the phase rotation vs frequency plots 401-402 show that the phase rotation between the three USRPs is linear across the 900 MHz frequency spectrum and can be used to estimate the time shifts.

As expected, the phase is linear across (e.g., see 401-402) 900 MHz. Hence, by fitting the points in FIG. 4 to a line the shifts $\tau_1$, $\tau_2$ and the relative phases of the hardware channels can be estimated (i.e. $<h_1(f)/h_2(f)$ and $<h_1(f)/h_3(f)$.

Figure 5:
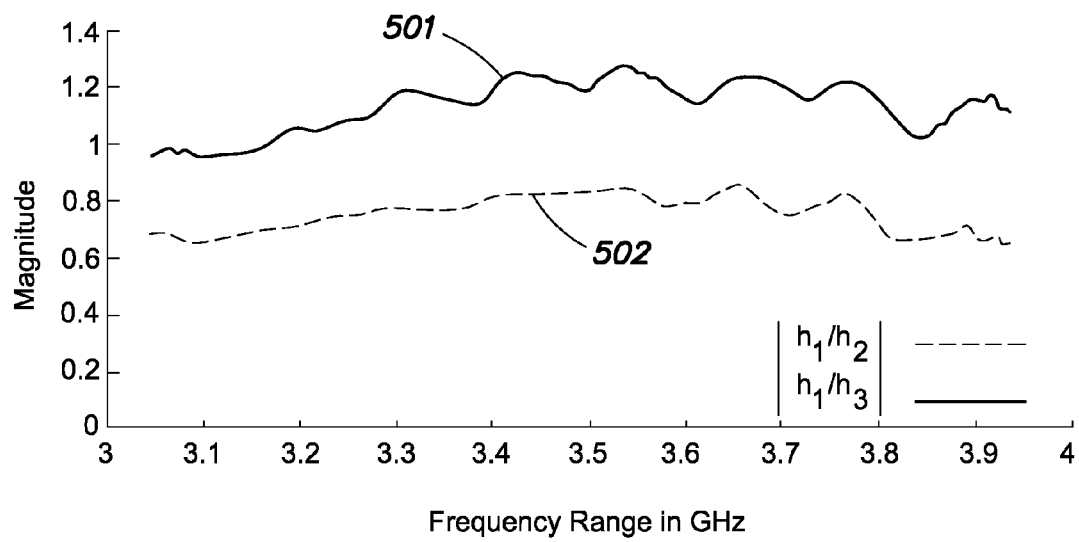
FIG. 5 shows hardware channel magnitude for an example implementation of a wideband wireless receiver configured for wideband GHz sensing according to one embodiment of the present invention.

FIG. 5 also shows the relative magnitudes of the hardware channels on the USRPs (i.e. $|h_1(f)/h_2(f)$ and $/h_1(n/h_3(f)|$) over the 900 MHz between 3.05 GHz and 3.95 GHz. The relative channel magnitudes |h1(f)/h2(f)| (e.g., see 502) and |h1(f)/h3 (f)| (e.g., see 301) are not equal to 1 and are not flat across the frequency spectrum. Hence, we need to compensate for these estimates to be able to detect and solve collisions. These hardware channels and time shifts are stable. In one implementation, the hardware channels and time shifts can be estimated only once at the set up time.

E. Sensing Non-Sparse Spectrum

In other embodiments, the concepts underlying BigBand can be extended to sense a non-sparse spectrum. The Inventors have recognized and appreciated that although the spectrum might not be sparse, changes in spectrum usage are typically sparse, i.e., over short intervals, in which only a small percentage of the frequencies are freed up or become occupied. This makes it possible to estimate the occupancy without sampling the signal at the Nyquist rate. Here sparse changes are referred to as differential sparsity, and the extension of the concepts disclosed herein that deals with such non-sparse spectrum is referred to as "D-BigBand." Unlike in the case where the spectrum is sparse, however, in the non-sparse setting we only perform spectrum sensing but the I and Q components of a given frequency component of the signal representing the monitored spectrum may not be recovered. The two components of D-BigBand are explained below.

Frequency Bucketization:

D-BigBand also bucketizes the spectrum using sub-sampling filters. However, since the spectrum is not sparse, it is very likely that all buckets will be occupied. Thus, D-BigBand tries to detect changes in the occupancy of frequencies that hash to each bucket. To do so, D-BigBand computes the average power of the buckets over two consecutive time windows TW by performing the bucketization multiple times during each time window (the number of times D-BigBand can average is =TW/T where T is the FFT window time). Since the changes in spectrum occupancies are sparse, only the average power of few buckets would change between the two time windows. D-BigBand can then focus only on the few buckets where the average power changes.

Frequency Estimation:

Now that D-BigBand knows in which buckets the average power has changed, it remains to estimate which of the frequencies in the bucket is the one whose occupancy has changed. However, the phase rotation property may no longer be used to estimate these frequencies or resolve their collisions since the phase of the bucket now depends on all the frequencies that hash to the bucket and not just the frequency whose occupancy has changed. Thus, to estimate the changing frequencies a different method can be used which is referred to as voting. The bucketization is repeated multiple times while randomizing which frequencies hash to which buckets. After that, each bucketization votes for frequencies that hash to buckets where the power changed. Frequencies that get the most number of votes are picked as the ones whose occupancy has changed. To randomize the bucketizations, co-prime sub-sampling is used which as described above guarantees that frequencies that hash together in one bucketization cannot hash together in the other bucketizations. Further details of how and why this voting approach works can be found in the technical report publication, H. Hassanieh, L. Shi, O. Abari, E. Hamed, and D. Katabi, "BigBand: GHz-Wide Sensing and Decoding on Commodity Radios," May 2013, MIT-CSAIL-TR-2013-009, which is herein expressly incorporated by reference.

As with any differential system, the state of spectrum occupancy may need to be initialized. However, an interesting property of D-BigBand is that the occupancy of each frequency in the spectrum can be initialized to unknown. This is because, when the difference is taken in power it can be told whether the frequency became occupied or it became empty. Specifically, a negative power difference implies that the corresponding frequency became empty, and a positive power difference implies that the corresponding frequency became occupied. Hence, once the occupancy of a frequency changes, its current state can be told irrespective of its previous state. This avoids the need for initialization and prevents error propagation.

F. A USRP-Based Example Implementation

In one example implementation, the systems shown in FIGS. 2A and 2B may employ USRP N210 software radios for the wireless receivers 205. Since the USRPs use the same ADCs, it is not possible to have co-prime sub-sampling rates. Thus, this implementation relies on resolving collisions without co-prime sub-sampling.

In this example, three USRP N210 radios are used with the SBX daughter boards, which can operate in the 400 MHz to 4.4 GHz range. The clocks of the three USRPs are synchronized using an external GPSDO clock. In order to sample the same signal using the three USRPs, the USRPs are connected to the same antenna using a power splitter but with wires of different lengths in order to introduce small time-shifts. The analog low pass filters are removed on the SBX daughterboards to allow the USRP's ADC to receive the entire bandwidth that its analog front-end circuitry is designed for. The analog circuitry of the USRP front-end can receive at most 0.9 GHz, which puts an upper bound on the digital bandwidth of the system. The three USRP ADCs each samples the signal at 50 MS/s (it should be noted that in principle, the USRP ADC can sample up to 100 MS/s. However, the USRP digital processing chain cannot support this rate and hence the ADC sampling rate can be set to no higher than 50 MS/s each). Thus, the implementation of BigBand captures a bandwidth BW=900 MHz using only 150 MS/s.

With respect to example implementation of D-BigBand, D-BigBand's frequency estimation relies on using different co-prime sub-sampling rates and hence D-BigBand may not be directly implemented on USRPs. Thus, to verify that D-BigBand can sense a non-sparse spectrum, trace-driven experiments are used. To collect traces of one GHz of highly occupied spectrum, many USRPs are used to transmit and receive. Since a total of 20 USRPs are used, they can be divided into 10 receivers and 10 transmitters and capture 250 MHz at a time. The process can be repeated this 4 times at center frequencies that are 250 MHz apart and stitch them together in the frequency domain to capture the full 1 GHz spectrum. Inverse FFT is then performed to obtain a time signal sampled at 1 GHz. This time domain signal is then sub-sampled using three co-prime rates: 1/21, 1/20, and 1/23 GHz, and D-BigBand is run using these sub-sampled versions of the signal.

G. BigBand's Spectrum Sensing Results

In one example, outdoor measurements are collected from the roof top of a 24 floor building. BigBand can capture the signal between 2 GHz and 2.9 GHz over 30 minutes, and is configured to compute the spectrum over an FFT window of size W. Example parameters for W can be W=10 ms and W=100 µs. The occupancy of a particular frequency is then calculated as the percentage of the FFT windows during which the frequency was occupied (i.e., the power at that frequency was at least twice the noise power).

Figure 6:
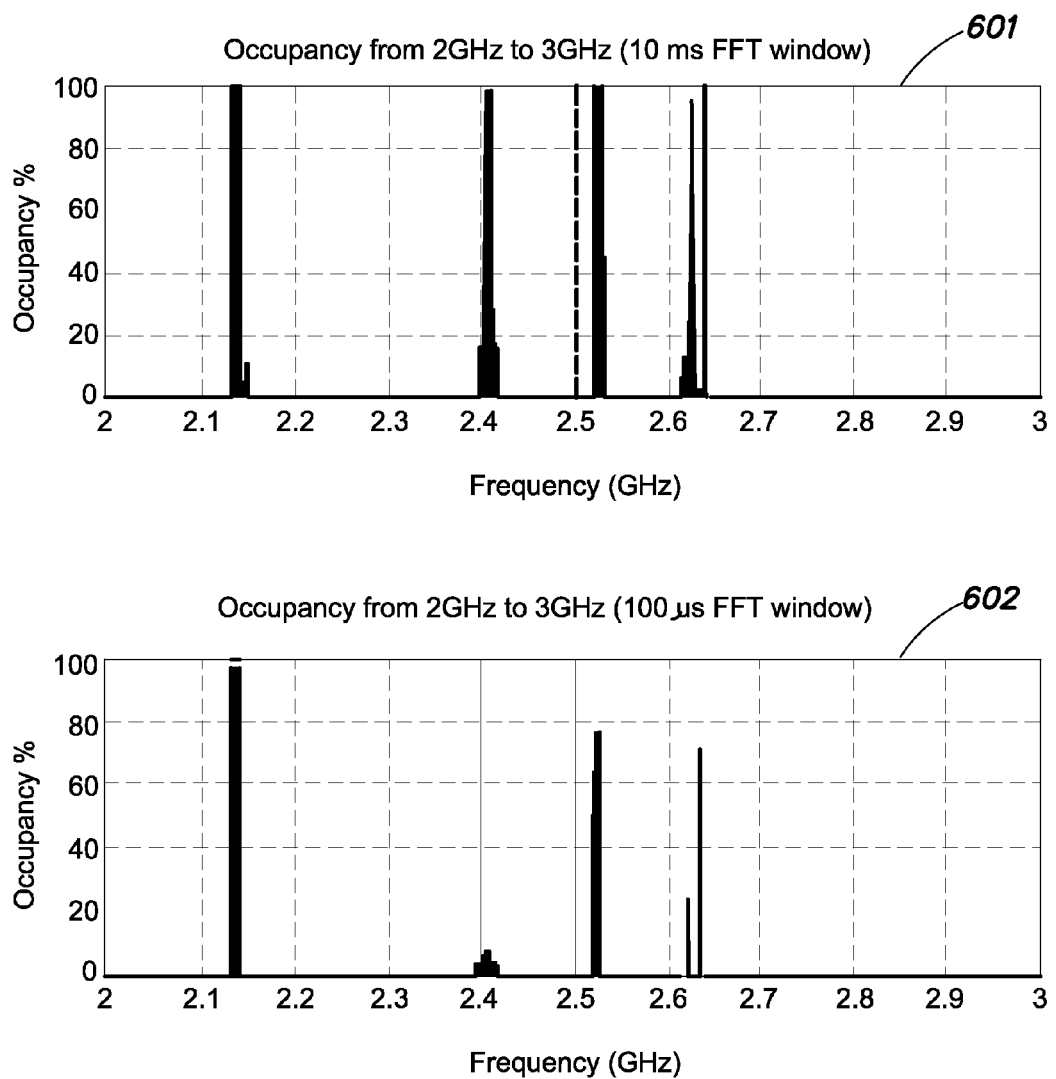
FIG. 6 shows an example of spectrum occupancy used for testing performance of the wideband wireless receiver implementation discussed in connection with FIG. 5, according to one embodiment of the present invention.

FIG. 6 is a graph similar to that shown in FIG. 1A (although with a different horizontal scale) and shows the fraction of time that each chunk of spectrum between 2 GHz and 2.9 GHz is occupied, as recovered by BigBand. In FIG. 6, the average spectrum occupancy at the geographical location of measurements between 1 PM and 2 PM is viewed at a 10 ms granularity (top graph 601) and 100 μs granularity (bottom graph 602). These graphs readily illustrate that the spectrum is sparsely occupied. Further, the sparsity increases when one computes the occupancy over shorter time windows.

These results were confirmed using a spectrum analyzer. In particular, the occupancy is about 5% when considered over FFT windows of 10 ms and drops to about 2%, when viewed over windows of 100 ps. The spectrum analyzer measurements also indicate that even frequencies that look 100% occupied over 10 ms windows become less occupied when viewed over shorter intervals. This is because while these frequencies are occupied for some fraction of every 10 ms interval, there is a large number of shorter windows within each 10 ms where these frequencies are not occupied. For example, with reference to the top graph 601 in FIG. 6, the WiFi band around 2.4 GHz seems fully utilized when checked over 10 ms windows; yet if one views it over windows that are shorter (see bottom graph 602 at 100 μs), or even 100 times shorter (i.e., 100 ps), one would discover that the medium is almost always idle. In contrast, the band around 2.1 GHz which is used by cellular technologies is occupied even at very short time scales (compare the top graph 601 to the bottom graph 602).

In a further implementation, measurements collected in other locations or on different dates show similar results to those in FIG. 6 but may differ slightly in which frequencies are occupied. Measurements from higher parts of the spectrum are qualitatively similar but have significantly higher sparsity.

Most of today's spectrum sensing equipment relies on scanning. Even expensive, power hungry spectrum analyzers typically capture a 100 MHz bandwidth in one shot, and end up scanning to capture a larger spectrum. The performance of sequentially scanning the spectrum depends mainly on how fast the device can scan a GHz of bandwidth. In the absence of fast scanning, the system can miss radar and other highly dynamic signals. Here, it is compared how fast it would take to scan the 900 MHz bandwidth using three techniques: state-of-the-art spectrum monitors like the RFeye, which is used in the Microsoft spectrum observatory, 3 USRPs sequentially scanning the 900 MHz, or 3 USRPs using BigBand.

Table 1 shows the results for different FFT window sizes. In all cases, BigBand takes exactly the time of the FFT window to acquire the 900 MHz spectrum. The 3 USRPs combined can scan 150 MHz at a time and hence need to scan 6 times to acquire the full 900 MHz. For FFT window sizes lower than 10 ms, the scanning time is about 48 ms. Hence, the USRPs spend very little time actually sensing the spectrum, which will lead to a lot of missed signals. Of course, state of the art spectrum monitors can do much better. The RFeye node has a fast scanning mode of 40 GHz/second. It scans in chunks of 20 MHz and thus will take 22.5 ms to scan 900 MHz. Note that RFeye has a maximum resolution of 20 kHz, and hence does not support FFT windows larger than 50 μs.

TABLE 1

| FFT Window | BigBand (900 MHz) | 3 USRP Seq. Scan (150 MHz) | RFeye Scan (20 MHz) |
| --- | --- | --- | --- |
| 1 μs | 1 μs | 48 ms | 22.5 ms |
| 10 μs | 10 μs | 48 ms | 22.5 ms |
| 100 μs | 100 μs | 48 ms | — |

TABLE 1-continued

| FFT Window | BigBand (900 MHz) | 3 USRP Seq. Scan (150 MHz) | RFeye Scan (20 MHz) |
| --- | --- | --- | --- |
| 1 ms | 1 ms | 54 ms | — |
| 10 ms | 10 ms | 114 ms | — |

The above table implies that the spectrum is sparser at finer time intervals, and provides more opportunities for fine-grained spectrum reuse. This result motivates the need for fast spectrum sensing schemes to exploit these short-term vacancies. Thus, BigBand, which in some example implementations uses off-the-shelf components, is much faster than even expensive scanning based solutions, allowing it to detect short-term spectrum vacancies.

To verify the range of sparsity for which BigBand works, additional experiments were implemented between 3.05 GHz and 3.95 GHz because this band is effectively empty. The sparsity is varied in the 3.05 GHz to 3.95 GHz range between 1% and 10% by transmitting from 5 different USRPs. Each USRP transmits a signal whose bandwidth is at least 1 MHz and at most 20 MHz. The bandwidth and the center frequencies of the signals transmitted by the USRPs are randomized. For each sparsity level, the experiment is repeated 100 times with different random choices of bandwidth and center frequencies, and BigBand is run over a 1 ms FFT window. Three example metrics are considered: (1) false negatives: the fraction of occupied frequencies that BigBand incorrectly reports as empty; (2) false positives: the fraction of empty frequencies that BigBand incorrectly reports as occupied; (3) unresolved frequencies: the fraction of total frequencies that Big-Band cannot resolve due to unresolved collisions.

Figure 7:
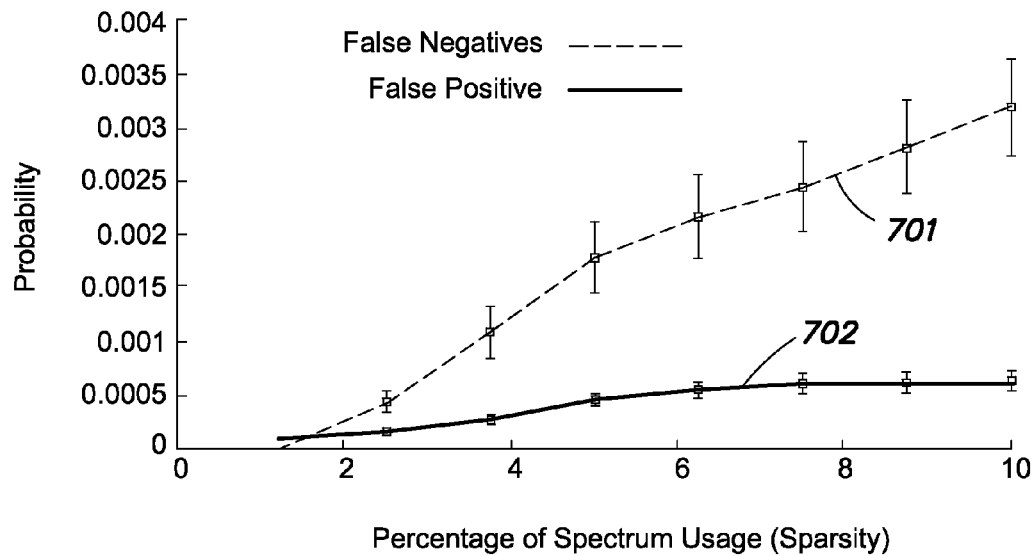
FIG. 7 shows false negatives and positives as a function of spectrum sparsity in connection with testing of spectrum sensing by the example implementation of the wideband wireless receiver discussed in connection with FIG. 5, according to one embodiment of the present invention.

FIG. 7 shows false negatives (701) and false positives (702) as a function of spectrum sparsity, which shows that Big-Band's false positives and false negatives rates are extremely low. The probability of false positive stays below 0.0005 even when 10% of the spectrum is occupied. The probability of false negative is less than 0.002 when the spectrum occupancy is less than 5%, and stays within 0.003 even when the spectrum occupancy goes up to 10%.

Figure 8:
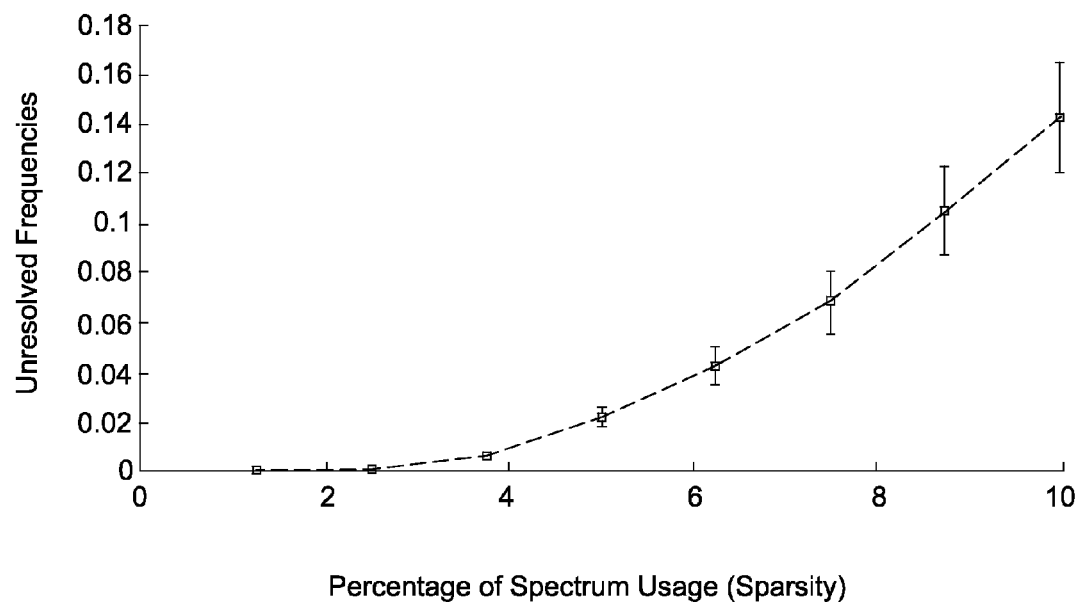
FIG. 8 shows unresolved frequencies as a function of spectrum sparsity in connection with testing of spectrum sensing by the example implementation of the wideband wireless receiver discussed in connection with FIG. 5, according to one embodiment of the present invention.

FIG. 8 shows unresolved frequencies as a function of spectrum sparsity. For example, BigBand may not resolve around 2% of the frequencies with 5% spectrum occupancy, and stays below 14% even when spectrum occupancy grows as large as 10%. The fraction of unresolved frequencies is less than 0.03 when the spectrum usage is below 5%. This number increases as the spectrum usage increases, but stays below 0.14 when 10% of the spectrum is used. Unresolved frequencies increase as spectrum usage increases because the probability of collision increases. Note however that in contrast to false positive and false negatives, BigBand knows which exact frequencies it could not resolve and reports these frequencies with the label "not-estimated". Thus, unresolved frequencies show lack of information as opposed to errors. The application can decide how to treat unresolved frequencies. For dynamic spectrum access, it can simply avoid the unresolved frequencies.

In another example, real-world spectrum measurements, for instance, in the Microsoft observatory, can reveal that actual spectrum usage is 2-5%. In this regime, BigBand's unresolved frequencies are less than 0.03. Further, if the occupancy is high, one may use D-BigBand, which deals with high occupancies.

H. BigBand's Decoding Results

In this section, it is verified that BigBand can concurrently decode a large number of transmitters from diverse parts of the spectrum. The transmitters employed in some experimental implementations use the same technology, but it should be appreciated that the results indicated here indicate that transmitters using different technologies may be effectively employed to successfully decode multiple different signals encoded with respective different protocols.

In one example implementation, 10 USRPs are used to emulate up to 30 transmitters hopping in a spectrum of 0.9 GHz. At any given time instant, each device uses 1 MHz of spectrum to transmit a BPSK signal. Similar to the Bluetooth frequency hopping standard, it is assumed that there is a master controller that assigns a hopping sequence to each transmitter device that ensures that no two devices hop to the same frequency at the same time instant. Note however, that the hopping sequence for different devices allows them to hop to frequencies that get aliased to the same bucket at a particular time instant, and hence collide in BigBand's aliasing filters. Like in Bluetooth, each transmitter hops 1, 3, or 5 times per packet, depending on the length of the packet.

Figure 9:
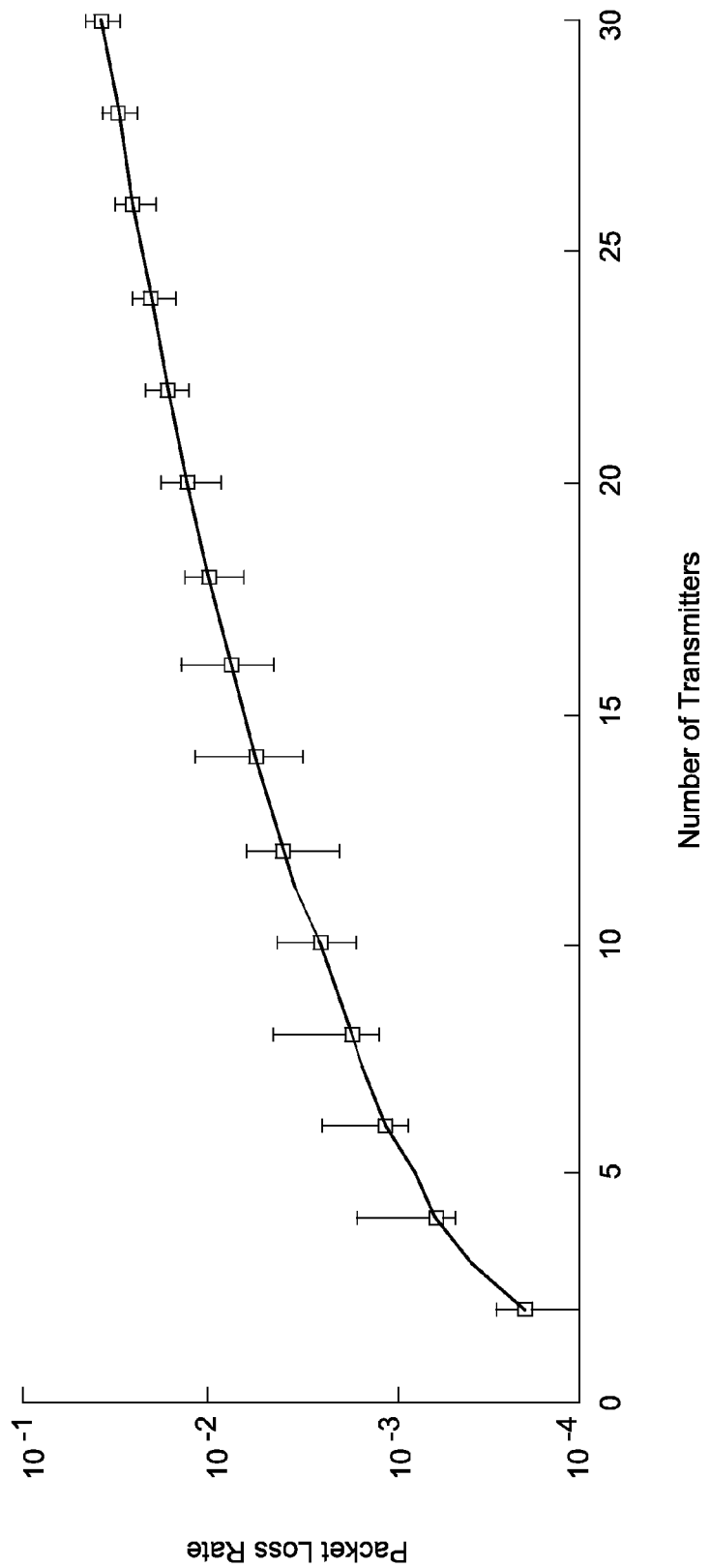
FIG. 9 shows packet loss as a function of the number of simultaneous transmitters in connection with testing of spectrum sensing by the example implementation of the wideband wireless receiver discussed in connection with FIG. 5, according to one embodiment of the present invention.

FIG. 9 shows BigBand's packet loss as a function of the number of simultaneous transmitters, e.g., the packet loss rate versus the number of devices hopping in the spectrum. It shows that BigBand can decode the packets from 30 devices spanning a bandwidth of 900 MHz with a packet loss rate less than 3.5%. Decoding all these transmitters without BigBand would either require a wideband 0.9 GHz receiver, or a receiver with 30 RF-frontends, both of which would be significantly more costly and power-hungry.

It some aspects, BigBand may have more noise than a narrowband receiver since it can capture a much larger bandwidth. Three types of noise are considered: thermal noise, quantization noise and ADC jitter noise. BigBand has higher thermal noise due to bucketization. Specifically, since in one implementation the 900 MHz bandwidth is aliased into 50 MHz, it is expected that the thermal noise would increase by 18× (12.5 dB). However, quantization noise and ADC jitter noise do not alias, and hence do not increase. The overall increase in noise depends on how the thermal noise compares to these other types of noise.

To understand the impact of thermal noise and quantify the SNR performance of BigBand, such performance is compared with that of a 50 MHz narrowband receiver that uses the same USRP hardware. A 10 MHz signal is transmitted, and received on BigBand and the narrowband receiver, and the resulting SNR is compared. BigBand and the narrowband receiver are connected to the same antenna and ensure that both receivers' rx-gains are set properly so that the received signal amplitude spans the same range on both receivers. The experiment is run with different receive signal strengths and measure the SNR on each, and the measurements are repeated for the ADC quantization set to 8 bits and 14 bits to better understand the interaction between thermal noise and quantization noise.

Table 2 shows the mean and max reduction in SNR of a signal received on BigBand relative to the narrowband USRP. The result shows that at 8 bit quantization, the reduction is a little less than 3 dB which means that the 12 dB increase in thermal noise only translates to 3 dB reduction in SNR due to quantization and jitter noise. At a quantization of 14 bits, the SNR reduction becomes 6 dB which means that the ADC jitter noise is still significantly higher than thermal noise. Though this reduction in SNR is significant compared to narrowband receivers, one would require using 18 such receivers to capture in real time the same 900 MHz bandwidth as BigBand which is not practical in terms of cost and bulkiness.

TABLE 2

Reduction in SNR at different quantization levels

| ADC Quantization | BigBand vs Narrowband RX | |
|---|---|---|
| | Mean | Max |
| 8 bits | −2.73 dB | −2.78 dB |
| 14 bits | −5.68 dB | −5.89 dB |

I. D-BigBand's Sensing Results

In this section, D-BigBand's ability to sense changes in spectrum occupancy independent of sparsity is evaluated. The percentage of total occupied frequencies in the spectrum are varied between 1% (sparse) to 95% (almost fully occupied), and then the number of frequencies is changed that change occupancy every 1 ms by up to 1% (i.e., 10 MHz), and D-BigBand's accuracy is evaluated in identifying the frequencies that change occupancy.

Figure 10:
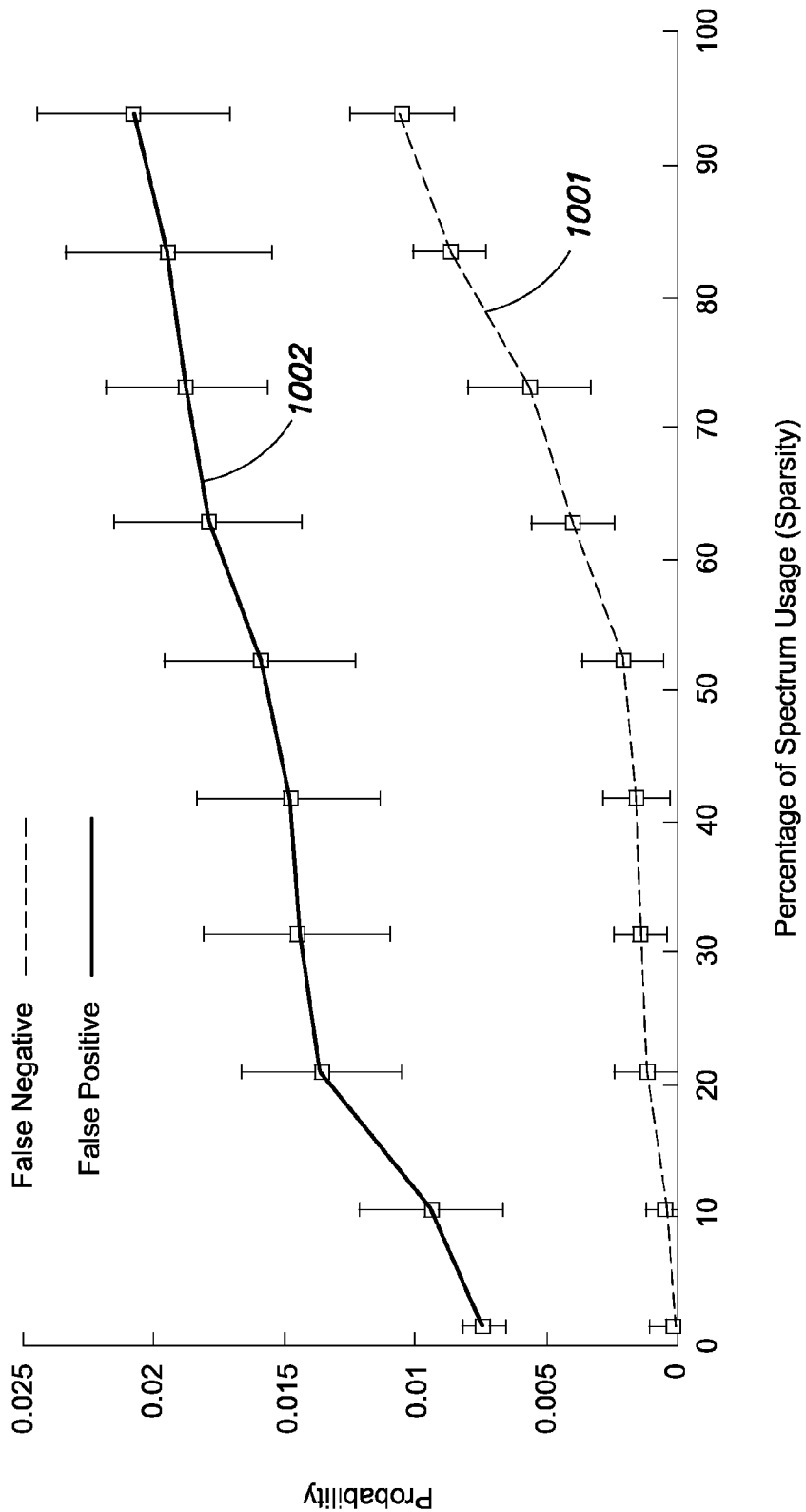
FIG. 10 illustrates effectiveness of detecting changes in spectrum occupancy across a range of spectrum sparsity in connection with spectrum sensing by another example implementation of a wideband wireless receiver according to one embodiment of the present invention.

FIG. 10 shows D-BigBand's effectiveness as a function of spectrum sparsity. For example, over a band of 1 GHz, D-BigBand can reliably detect changes in spectrum occupancy even when the spectrum is 95% occupied, as long as the change in spectrum occupancy is less than 1% every ms.

As a function of spectrum occupancy, FIG. 10 shows the false positives 1002 (i.e., frequencies whose occupancy has not changed, but D-BigBand erroneously declared as changed) and false negatives 1001 (i.e., frequencies whose occupancy has changed, but D-BigBand erroneously declares as unchanged). As shown in FIG. 10, D-BigBand robustly identifies changes in occupancy, with both the false positive and the false negative probabilities remaining under 0.02 even for a spectrum occupancy of 95%.

IV. ASIC IMPLEMENTATIONS

Applications like spectrum sensing, radar signal processing, and pattern matching by convolving a signal with a long code (as in GPS) require large FFT sizes. Application Specific Integrated Circuit (ASIC) implementations of such large FFTs are challenging due to their large silicon area and high power consumption. However, as noted above the monitored spectrum and corresponding signals representing the monitored spectrum in these applications generally is "sparse," i.e., the energy at the output of the FFT is concentrated at a limited number of frequencies, and has zero/negligible energy at most frequencies.

In yet other embodiments of methods and apparatus for monitoring occupancy of wideband GHz spectrum, and sensing (and in some instances decoding) respective frequency components of time-varying signals using sub-Nyquist criterion signal sampling, a very large scale integration (VLSI) implementation of such methods and apparatus is realized in the form of an ASIC.

In one embodiment of such an ASIC implementation, and with reference again to FIG. 2B, at least the FFT processing apparatus 210 of the system 1000A may be implemented as an ASIC chip 215. In one example of such an embodiment, an ASIC chip implements a 746,496-point sFFT (i.e., N=746, 496), yet occupies only 0.6 mm² of silicon area. At an operating voltage of 0.66V, it consumes 0.4 pJ/sample and has an effective throughput of 36 GS/s. The effective throughput is computed over all frequencies but frequencies with negligible magnitudes are not produced. The chip works for signals that occupy up to 0.1% of the transform frequency range (0.1% sparse). It can be used to detect a signal that is frequency hopping in a wideband, to perform pattern matching against a long code, or to detect a blocker location with very high frequency resolution. For example, it can detect and recover a signal that occupies 18 MHz randomly scattered anywhere in an 18 GHz band with a frequency resolution of ~24 kHz.

Figure 11A:
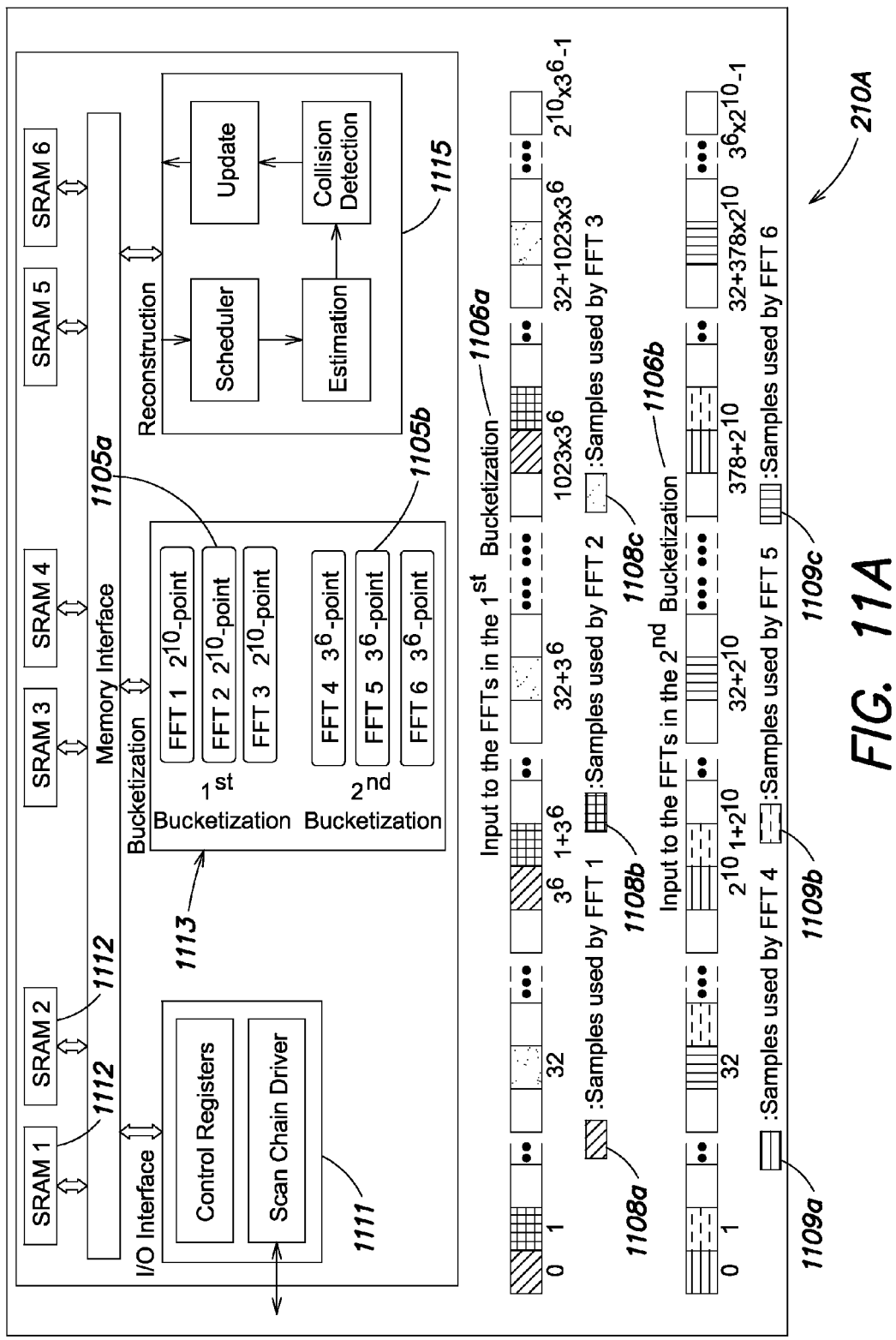
FIGS. 11A-B shows block diagrams illustrating example architectures for an ASIC chip implementation of the FFT processor apparatus shown in FIGS. 2A-B, according to one embodiment of the present invention.
Figure 11B:
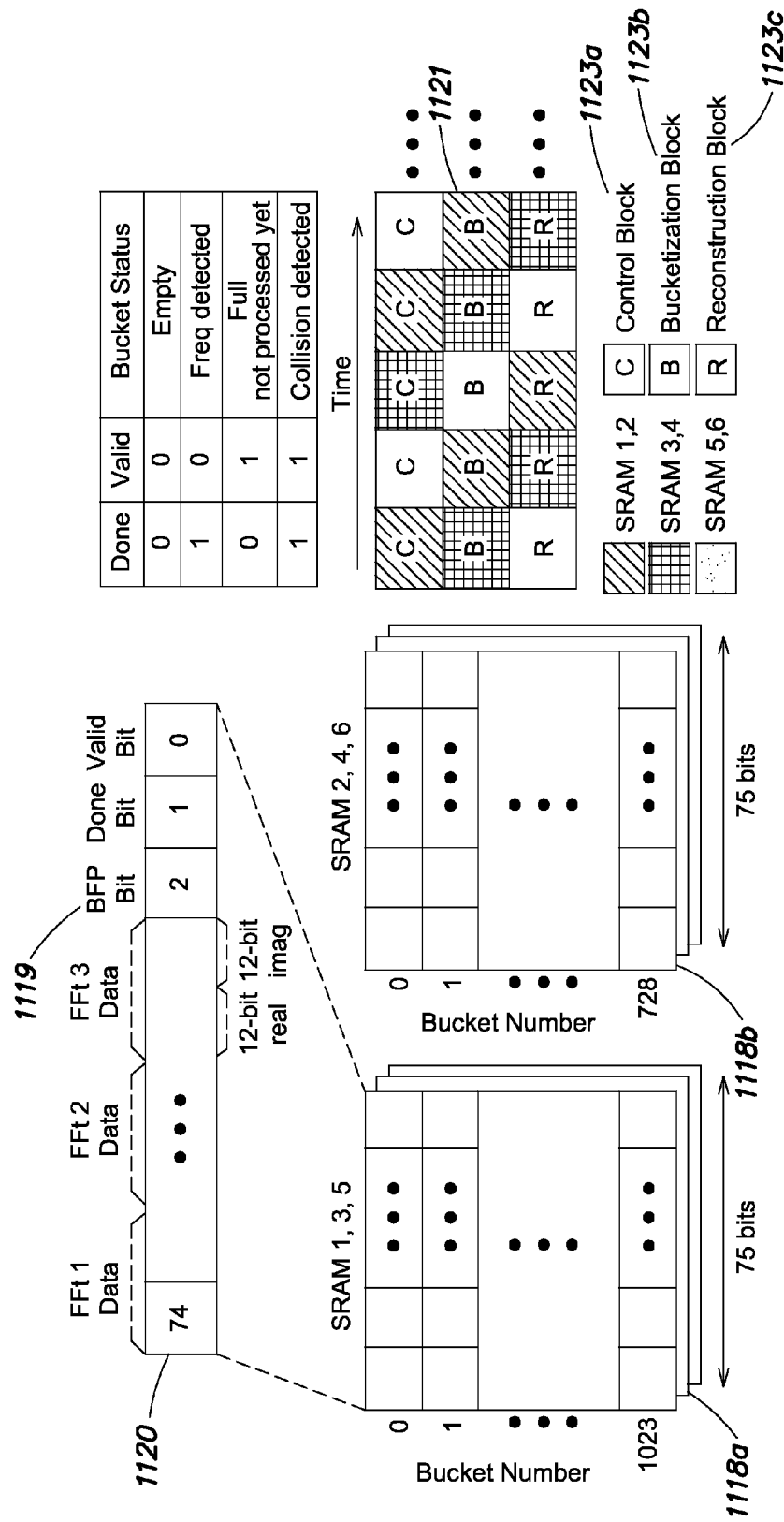

FIGS. 11A-B provide a block diagram of an ASIC chip according to one embodiment of the present invention, showing a 12-bit, N=746,496 ($2^{10}\times36$)-point FFT processing apparatus 210A having six sFFT processors, as well as input samples to the 6 FFTs. Two types of sFFT processors (e.g., $2^{10}$-point 1105a, and $3^6$-point 1105b) are used for respective bucketizations based on co-prime sub-sampling aliasing filters. The inputs (e.g., 1106a) to the $2^{10}$-point FFTs are the signal sub-sampled by $3^6$, while the inputs (e.g., 1106b) to the $3^6$-point FFTs are the signal sub-sampled by $2^{10}$. According to one aspect, FFTs of sizes $2^{10}$ and $3^6$ are chosen since they are co-prime and can be implemented with simple low-radix FFTs.

In FIG. 11A, three sFFT processors (e.g., 1108a-c, and 1109a-c) of each size (sFFTs 1, 2, and 3 for $2^{10}$-point; sFFTs 4, 5, and 6 for $3^6$-point) are used with digital sample inputs of the time-varying signal corresponding to the monitored spectrum shifted by 0, 1 and 32 samples (out of a total of N samples), respectively. In an alternative embodiment, it should be appreciated that shifts of 0 and 1 samples may be sufficient for a given spectrum sensing application. However, in the embodiment of FIG. 11A, the third shift is used to increase accuracy in the frequency position estimation, as discussed in greater detail below. While not shown explicitly in FIG. 11A (but as discussed above in connection with FIG. 2B), in one implementation, for each sub-sampling rate, a corresponding number of ADCs may be employed to provide the time shifted samples (e.g., two ADCs for shifts of 0 and 1, or three ADCs for shifts of 0, 1, and 32, with respective time-delayed inputs to provide the corresponding shifts by some number of samples out of N samples). One 1024-word and one 729-word SRAMs are used for three $2^{10}$-point and three $3^6$-point FFTs, respectively. SRAMs (e.g., 1112) are triplicated to enable pipelined operation of the I/O interface (1111), Bucketization (1113) and Reconstruction (1115) blocks. Thus, three sFFT frames exist in the pipeline.

FIG. 11B shows example memory structures of the ASIC chip 210A. SRAMs 1, 3, and 5 (1118a, used by $2^{10}$-point FFT cores) rotate between three blocks: I/O interface (1111), Bucketization (1113) and Reconstruction (1115) as shown in FIG. 11A. Similarly, SRAMs 2, 4 and 6 (1118b) are used by $3^6$-point FFT cores. For example, the data block 1121 shows data allocation at SRAM 1, 2, 3, 4, 5, and 6, and data types (e.g., control block 1123a, bucketization block 1123b, reconstruction block 1123c). The Block Floating Point (BFP) bit (1119) in the data block 1120 indicates whether the values in the bucket are using the exponent of BFP or not.

Figure 12A:
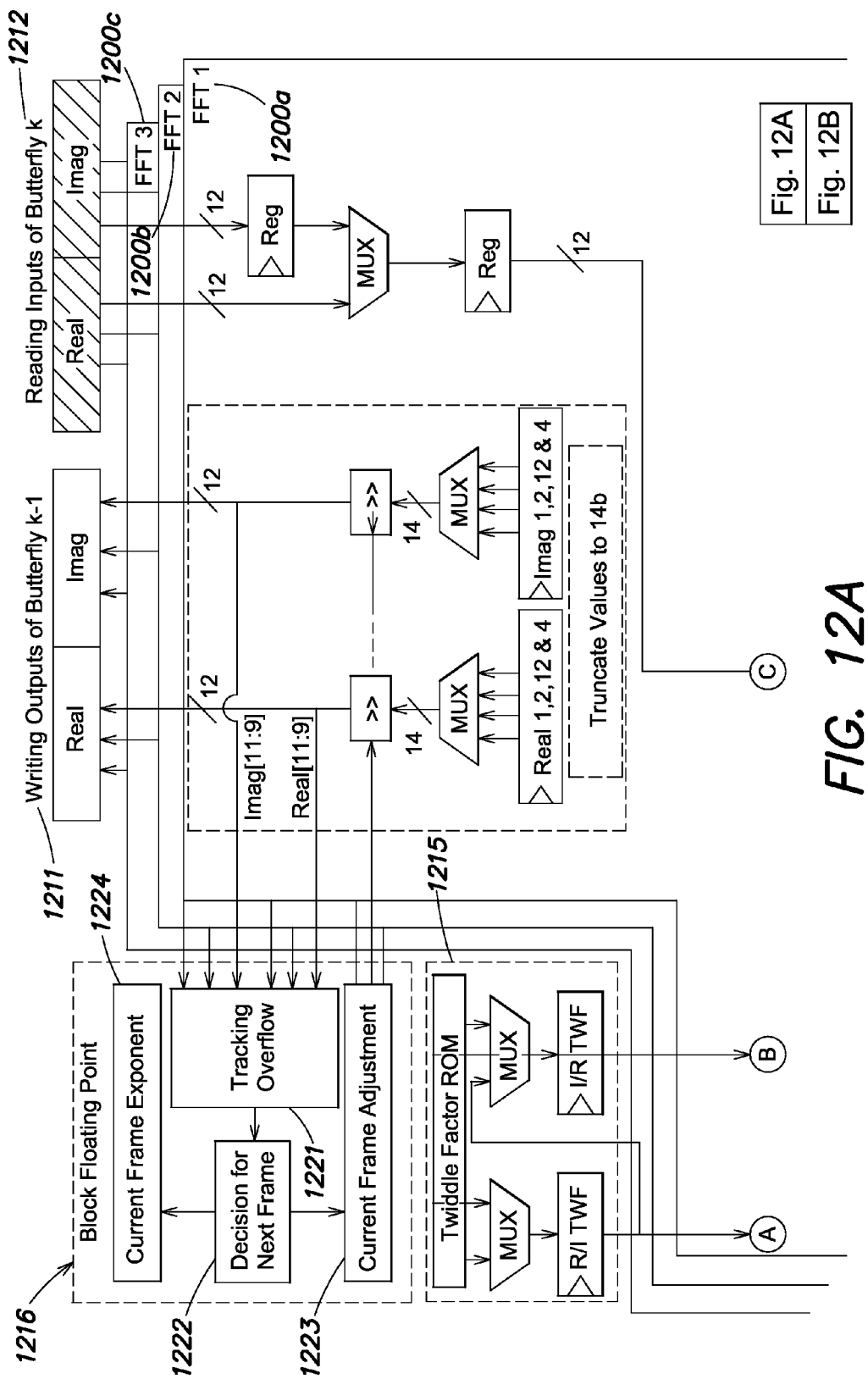
FIGS. 12A-B show block diagrams illustrating the micro-architecture of a $2^{10}$-point FFT of the FFT processor apparatus shown in FIGS. 11A-B, according to one embodiment of the present invention.
Figure 12B:
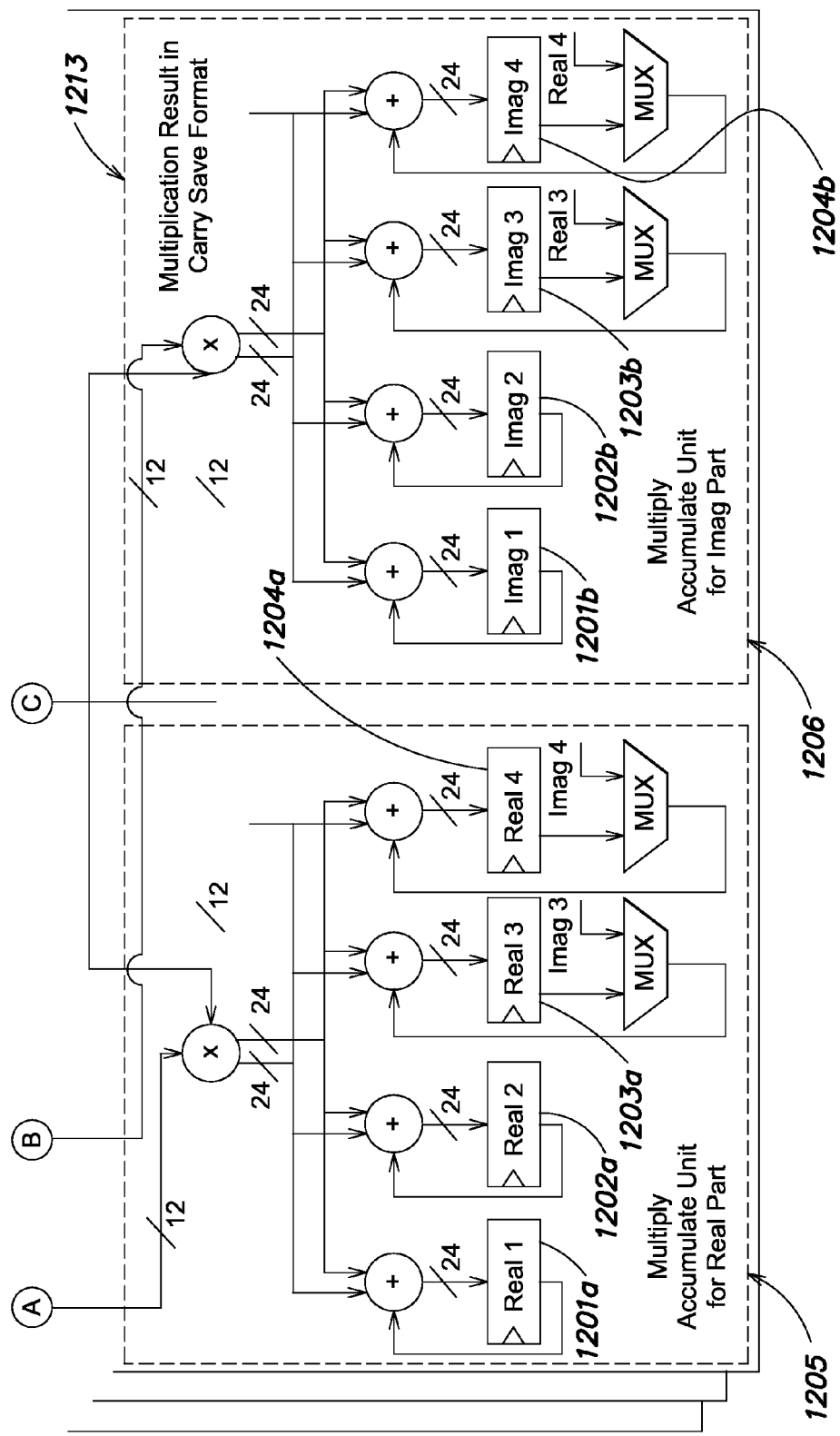

The micro-architecture of the $2^{10}$-point FFT is shown in FIGS. 12A-B. Each $2^{10}$-point FFT uses one radix-4 butterfly (e.g., 1200a-b) to perform an in-place FFT, which is optimized to reduce area and power consumption as follows. First, the FFT block performs read (1211) and write (1212) operations at even and odd clock cycles, respectively, which enables utilizing single port SRAMs. A single read operation provides three complex values, one for each radix-4 butterfly (in each FFT blocks 1200a-c). The complex multiplication is computed over two clock cycles using two multipliers for each butterfly, e.g., a multiply accumulate unit for the real part 1205 that calculates the real components 1201a, 1202a, 1203a and 1204a in a radix-4 butterfly, and a multiply accumulate unit for imaginary part 1206 that calculates the imaginary components 1201a, 1202b, 1203b and 1204b in the radix-4 butterfly. The multiplication result can be saved in a carry save format, e.g., at 1213. Second, a twiddle factor (TWF) control unit 1215 is shared between the three butterflies. Third, the block floating point (BFP) technique is used to minimize the quantization error (as also mentioned in FIG. 11B), e.g., at the BFP component 1216. BFP is implemented using a single exponent shared between FFTs 1200a-c, and scaling is done by shifting in case of overflow. For example, the BFP may receive imaginary components and real components from the three FFTs to track the overflow (at 1221), and make a decision to scale the components for the next frame (at 1222) and/or to adjust the current frame (at 1223). A current frame exponent may be determined based on the overflow situation (at 1224). Round-half-away-from-zero is implemented by initializing the accumulator registers with 0.5 LSB and truncating the results. The $3^6$-point FFTs are similar, but use radix-3 butterflies.

Figure 13A:
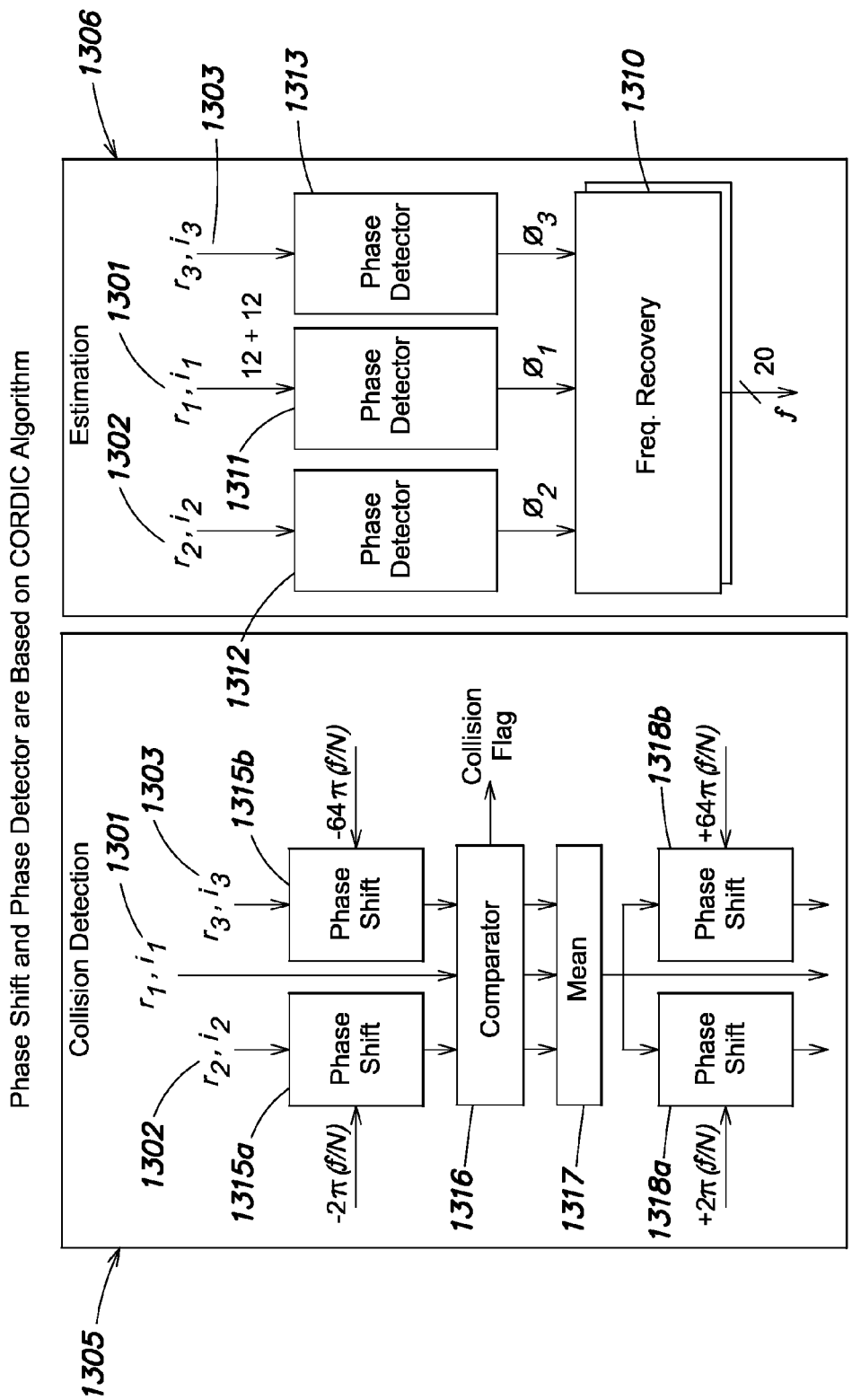
FIGS. 13A-B show block diagrams illustrating the chip micro-architecture of collision detection and estimation in the FFT processor apparatus shown in FIGS. 11A-B to facilitate at least a portion of the sensing method shown in FIG. 2C, according to one embodiment of the present invention.
Figure 13B:
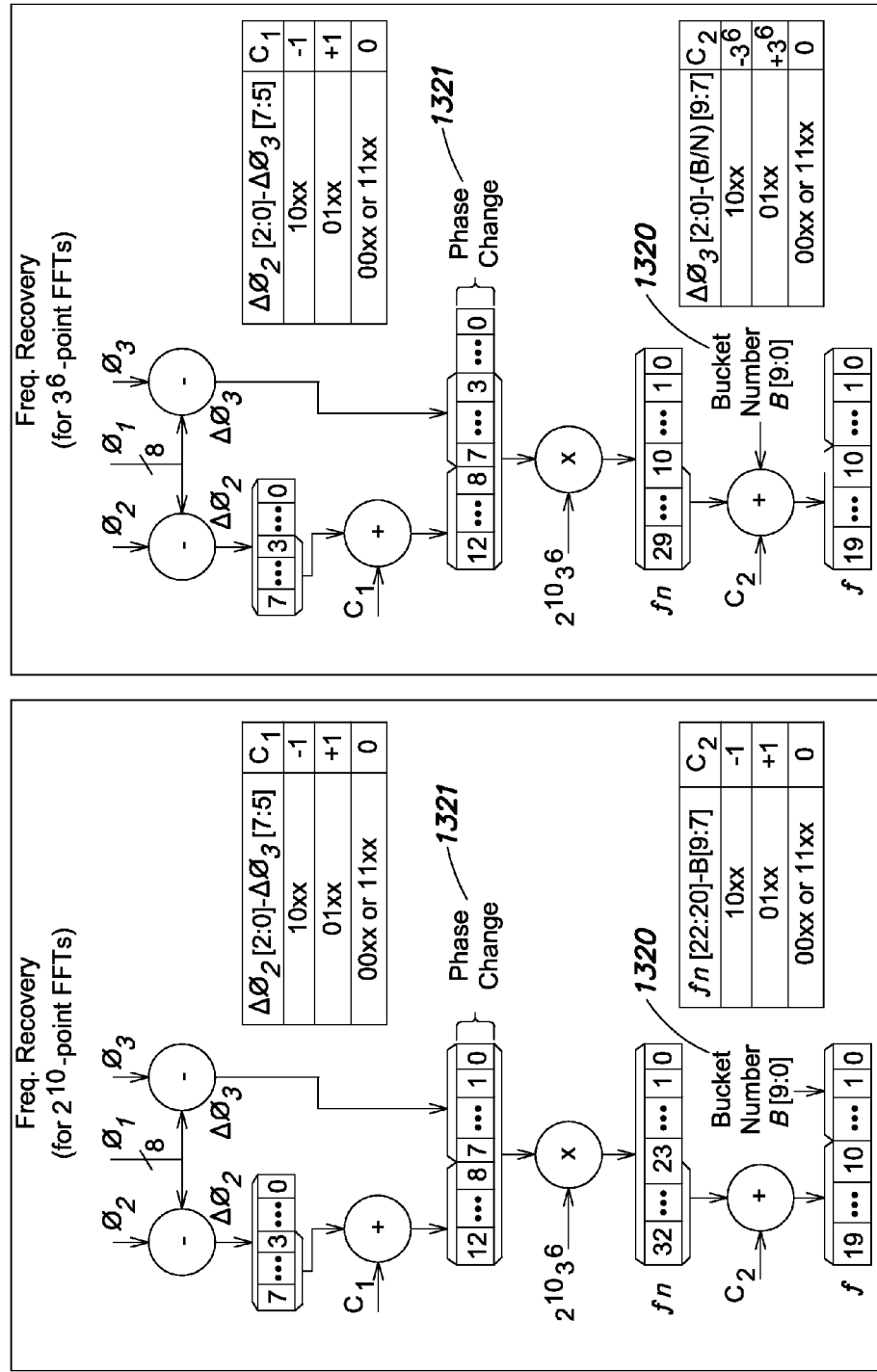

FIGS. 13A-B show block diagrams illustrating the micro-architecture of collision detection and estimation. Phase Shift and Phase Detector units use the CORDIC algorithm. The Estimation block (1306) operates in two steps. First, time shifts of 1 and 32 samples are used to compute the MSBs and LSBs of the phase change, respectively (i.e., by operation of the input/output interface, a given set of digital samples of the time varying signal representing the monitored spectrum is first shifted by one sample, and then shifted by 32 samples). A 3-bit overlap is used to fix errors due to concatenation. Since the 5 MSBs of phase change are taken directly from the output of Phase Detectors 1311, 1312 and 1313, active frequencies have to be ~30 dB above the quantization noise to be detected correctly. Frequencies below this level are considered negligible. Output from the Phase Detectors (1311-1313) are input into a frequency recovery module 1310. For example, at the frequency recovery module (e.g., 1310a for $2^{10}$-point FFT or 1310b for $3^6$-point FFT), the frequency number is estimated from the phase change (1321). This frequency number may have errors in the LSBs due to quantization noise. The second step corrects any such errors by using the bucket number (1320) to recover the LSBs of the frequency number. This can be done because all frequencies in a bucket share the same remainder i (i=f mod M A, where f is the frequency number and M is the FFT size), which is also the bucket number. Thus, in the Frequency Recovery block (1310a) associated with the $2^{10}$-point FFTs, the bucket number gives the 10 LSBs (B[9: 0]) of the frequency number. However, in the Frequency Recovery (1310b) for the $3^6$-point FFTs, the LSBs cannot be directly replaced by the bucket number since M=$3^6$ is not a power of 2. Instead, the remainder of dividing the frequency number by $3^6$ should be calculated and subtracted from the frequency number. The bucket number is then added to the result of the subtraction. In our implementation, calculating and subtracting the remainder is done indirectly by truncating the LSBs of the phase change.

The Collision Detection block in FIG. 13A compares the values of the buckets with and without time-shifts. The complex values $(r_1, i_1)$ 1301, $(r_2, i_2)$ 1302 and $(r_3, i_3)$ 1303 are the output of bucketization (e.g., see FIG. 2C) for time-shifts 0, 1 and 32 samples. The complex values 1301-1303 are then input into the collision detection module 1305 and estimation module 1306. For example, at the estimation module 1306, the complex values outputs 1301-1303 from bucketization are passed onto phase detectors 1311-1313, respectively, to recover frequency components at 1310. The frequency recovery module for $2^{10}$-point FFTs and $3^6$-point FFTs are shown in 1310a-b, respectively. The collision detection module 1305 then uses the estimated frequency to remove the phase change in the time-shifted bucketizations and compares the three complex values to detect collisions. For example, the complex value 1302 is phase-shifted by $-2\pi(f/N)$ at 1315a, and complex value 1303 is phase shifted by $-64\pi(f/N)$ at 1315b; and the complex value 1301, and phase-shifted values 1301 and 1303, are then compared for collision detection at 1316. In the case of no-collision, the three values are averaged to reduce noise at 1317, and may be phase-shifted back at 1318a-b, e.g., by $+2\pi(f/N)$ at 1318a, and by $+64\pi(f/N)$ at 1318b. The result is used to update the output of the FFT in SRAMs.

To example more closely the effect of the multiple time shifts (i.e., by taking respective FFTs of digital sample sets of the time-varying signal that have been shifted by some number of samples out of a total of N samples), consider that the performance of sFFT algorithm can be affected by the noise when the input signal is noisy. In many applications (such as communications), the signal of interest is noisy and may have a low SNR. Noise in the input signal can in some instances adversely impact the efficacy of the frequency estimation process. To see this effect, recall that the frequency position of a sensed frequency component is estimated using the phase change at the output of an FFT based on time-shifted digital samples being processed by the FFT:

$$\Delta\varphi = \frac{2\pi f \tau}{N} \longrightarrow f = \frac{N\Delta\varphi}{2\pi\tau}$$

In the above equation, $\tau$ is the amount of shift performed in time domain signal by shifting samples in a set of digital samples of the time-varying signal representing the monitored spectrum (i.e., in this instance $\tau$ is in units of "samples"), N is the size of the overall FFT (e.g., approximately 0.75 million in the ASIC chip example discussed above) and f is the frequency position number of a sensed frequency component (f can be 0 to N). When $\tau=1$ sample, the phase change varies from 0 to $2\pi$ depending on the position of the sensed frequency component. Hence, there is a one to one mapping between f and $\Delta\varphi$ which enables estimation of f from $\Delta\varphi$. Note that a small noise in the input signal may result in an error in $\Delta\varphi$. This impairment may in some instance result in a significant error in estimated frequency position f, since f is estimated by multiplication of $\Delta\varphi$ by N which is a large number.

To address this possible frequency position estimation error, multiple shifts ($\tau$) are used to estimate the frequency position. In the ASIC implementation discussed above, time shifts corresponding to shifting digital sample sets by 1 sample and 32 samples, respectively are considered. For purposes of the present discussion, we consider shifts of 1 sample and 2 samples to illustrate the salient concepts. It should be appreciated that a higher number of shifts (e.g., 32 samples) in some instances results in a correspondingly higher immunity to input signal noise.

As noted above, when $\tau$ is 1 sample, $\Delta\varphi$ varies from 0 to $2\pi$ and there is a one-to-one mapping between $\Delta\varphi$ and f. Hence, f can be estimated from $\Delta\varphi$. However, it has error because of noise. For larger shift $\tau$, say $\tau=2$ samples, $\Delta\varphi$ varies from 0 to $2*2\pi$ which is equivalent to 0 to $2\pi$ phase change. This means that two different frequency positions f result in the same phase shift $\Delta\varphi$ and there is no one-to-one mapping anymore. Specifically, the most significant bit (MSB) of estimated frequency position f may be vague. On the other hand, the other bits of estimated frequency f have higher immunity to noise. This is due to the fact that in this case $\tau$ is equal to 2 and hence f is estimated by multiplication of $\Delta\varphi$ to a smaller value (i.e. $N/2\pi*2$) compare to the case where $\tau$ is one and f is estimated by multiplication of $\Delta\varphi$ by $N/2\pi$. Therefore, the noise has a smaller effect on the estimation of frequency position f when $\tau$ is bigger. Larger time shifts, however, may sacrifice accuracy in detecting the MSB of the estimated frequency position f, and thus a tradeoff exists between the noise performance and accuracy of detecting the MSB.

The bucket number can be used to recover the LSBs of f Recall that frequency f aliases to bucket number i, i.e., i=f mod $B_1$ where B is the size of the FFT used in bucketization.

In summary, to estimate f, the set of digital samples representing the time-varying signal corresponding to the monitored spectrum is shifted by one sample, and the phase change is used to estimate the MSB of f. Then the set of digital samples representing the time-varying signal is shifted by some larger number of samples (e.g., 2 samples, 32 samples, etc.), and the corresponding phase change is used to estimate the rest of the bits. Note, that still some of the least significant bits (LSBs) may be corrupted due to noise. These bits can be corrected using the bucket number (i=f mod B) since the noise cannot affect the bucket number.

Thus, in one implementation, the frequency position number f for a sensed frequency component of the monitored spectrum as provided by a given B-point sFFT processor of the FFT processing apparatus 210 is expressed as a 20-bit digital word, in which two different time shifts (i.e. shift by 1 sample and then shift by 2 or 32 samples) and bucket number can be used in the estimation of f. For example, the LSBs (bits 0-9) of the 20-bit digital word are estimated/corrected using the bucket numbers. The next 5 bits (bits 10-14) are estimated using the result from the shift by 2 or 32, and the MSBs (bits 15-19) are estimated using the result from shift by 1.

Figure 14:
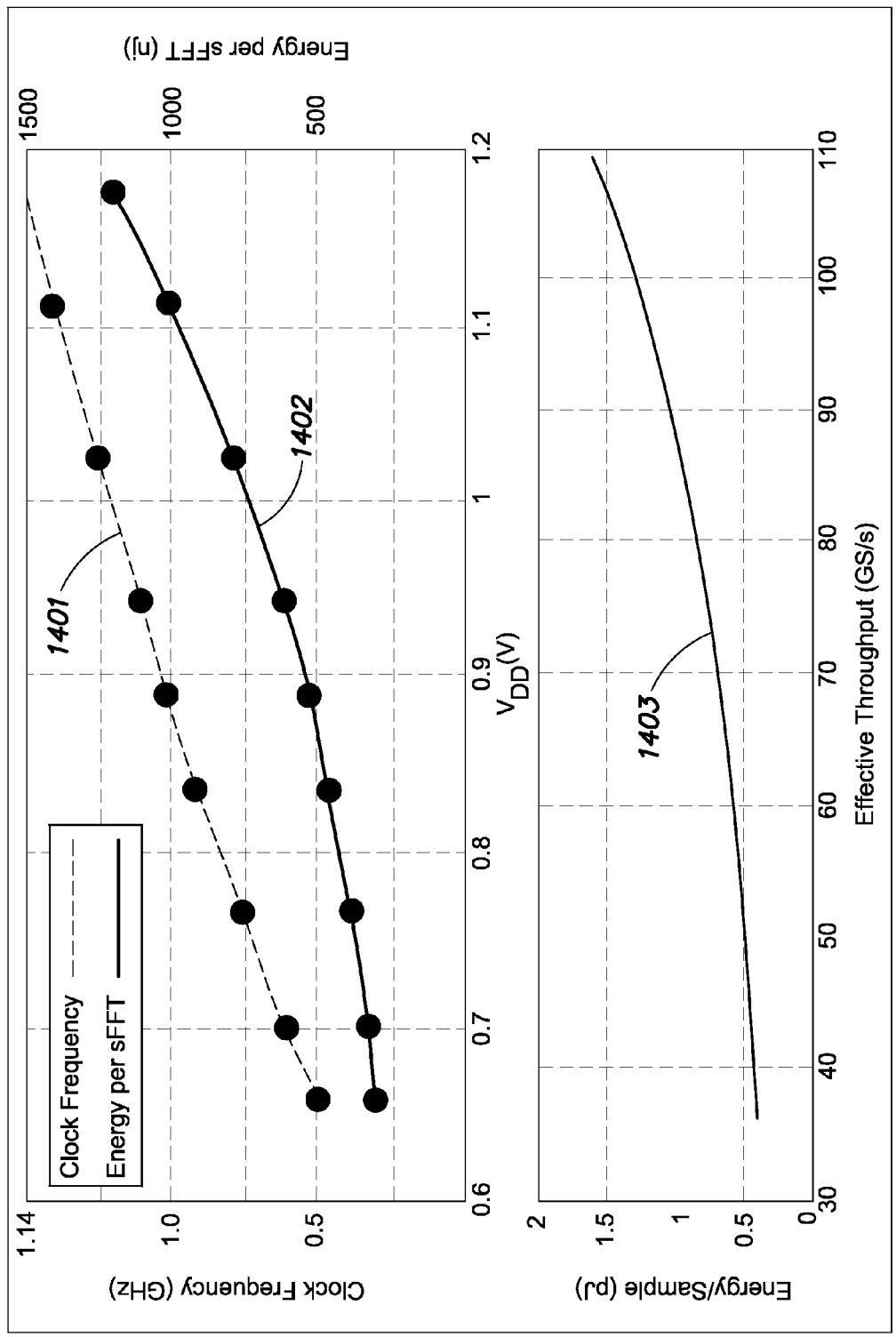
FIG. 14 shows measured energy and operating frequency for a range of voltages, and throughput versus energy per sample for computing a 746,496-point sparse Fourier transform by an example implementation of an FFT processing apparatus according to the block diagrams of FIGS. 11A-B, according to one embodiment of the present invention.

FIG. 14 shows measured energy and operating frequency for a range of voltage, and throughput versus energy per sample for computing a 746,496-point sparse Fourier transform. The testchip is fabricated in IBM's 45 nm SOI technology. The sFFT core occupies 0.6 mm2 including SRAMs. At a supply voltage of 1.18V, the chip operates at a maximum frequency of 1.5 GHz, resulting in an effective throughput of 109 GS/s. At this frequency, the measured energy efficiency is 1.2 µJ per 746496-point Fourier transform. Reducing the clock frequency to 500 MHz enables an energy efficiency of 298 nJ per Fourier transform at 0.66V supply voltage. For example, energy 502 and operating frequency 501 for a range of supply voltages are shown in FIG. 14.

The ASIC implementations of sFFT discussed above are compared with other low-power implementations of the traditional FFT, such as the FFT implementations described in M. Seok et al., "A 0.27V 30 MHz 17.7 nJ/transform 1024-pt Complex FFT Core with Super-Pipelining," ISSCC Dig. Tech Papers, 2011 (hereinafter "Seok"), Y. Chen et al., "A 2.4-Gsample/s DVFS FFT Processor for MIMO OFDM Communication Systems," IEEE J. Solid-State Circuits, May 2008 (hereinafter "Chen"), and C. Yang et al, "Power and Area Minimization of Reconfigurable FFT Processors: A 3GPP-LTE Example," IEEE J. Solid-State Circuits, March 2012 (hereinafter "Yang"). The measured energy is normalized by the Fourier transform size to obtain the energy per sample, as shown at 1403 (the sFFT chip however outputs only active frequencies).

FIG. 15 shows measured energy efficiency and performance of the sFFT chip compared to published FFTs by comparing the implementations in the work of Seok, Chen and Yang for sparse and non-sparse signals while the sFFT chip works for signal sparsity up to 0.1%. However, for such sparse signals, the sFFT chip delivers ~40× lower energy per sample for a 36 times larger FFT size. FIG. 6 also shows that the 746,496-point sFFT chip achieves an 88× reduction in run-time compared to a C++ implementation running on an i7 CPU.

Figure 16:
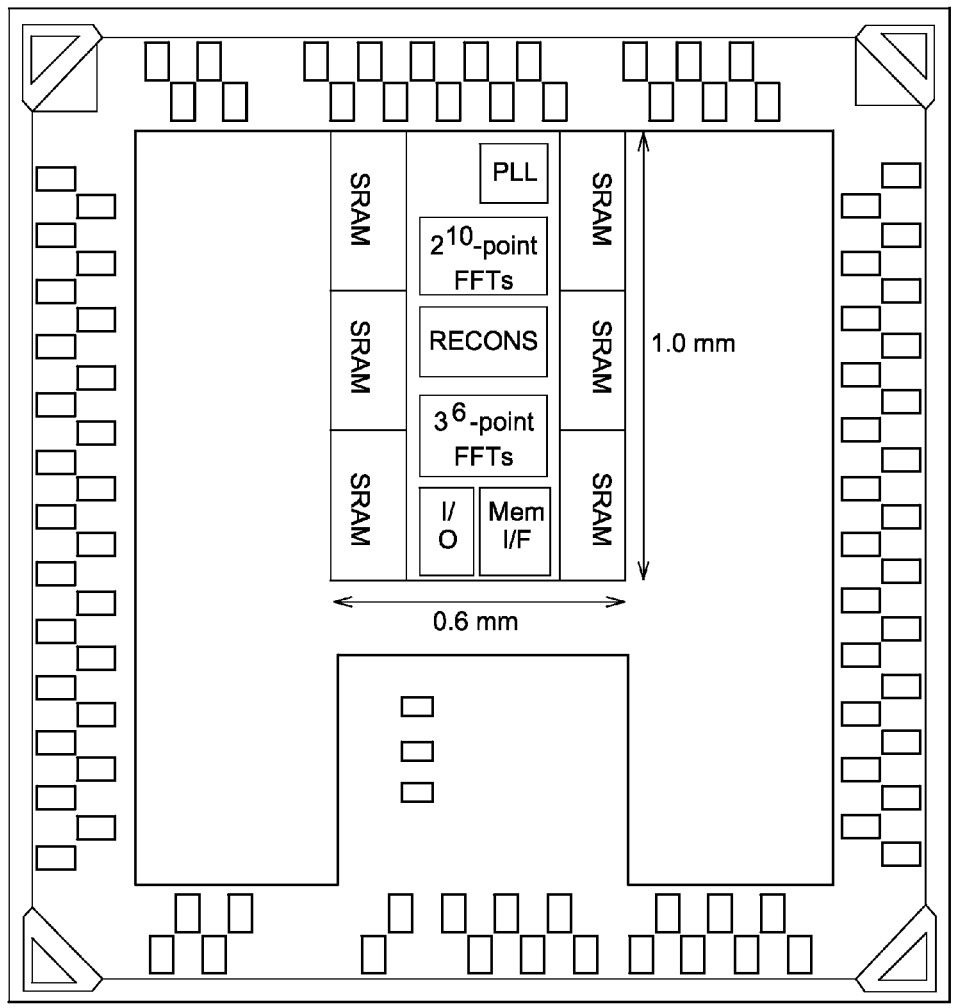
FIG. 16 shows a die photo of an ASIC chip implementation of the FFT processor illustrated in the block diagrams of FIGS. 11A-B, according to one embodiment of the present invention.

FIG. 16 shows a die photo of the testchip. Example technological specification of the testchip is provided in the chip features table at 1601, e.g., including the dimension of the core area, SRAM size, core supply voltage, clock frequency, core power, and/or the like.

V. CONCLUSION

This application presents a conceptual framework referred to as "BigBand" that enables GHz-wide sensing and decoding using commodity radios. Empirical evaluation demonstrates that BigBand is able to sense the spectrum stably and dynamically under different sparsity levels; BigBand's effectiveness is demonstrated as a receiver to decode GHz-wide sparse signals. In one implementation, BigBand enables multiple applications that would otherwise require expensive and power hungry devices, e.g. real-time spectrum monitoring, dynamic spectrum access, concurrent decoding of multiple transmitters in diverse parts of the spectrum.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (e.g., of designing and/or operating transparent displays) may be implemented using hardware, software, or a combination thereof. When implemented in software, the software code can be executed on any suitable processor or collection of processors, whether provided in a single computer or distributed among multiple computers.

Further, it should be appreciated that the present displays and methods of making and operating displays may be used in conjunction with a computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An integrated circuit apparatus to determine an N-point Fast Fourier Transform (FFT) of a time-varying signal so as to sense one or more frequency components of the time-varying signal, the apparatus comprising:

an input/output interface to receive a first sub-sampled set of samples of the time-varying signal sampled at a first sampling rate below a Nyquist rate of the time-varying signal and a second sub-sampled set of samples of the time-varying signal sampled at a second sampling rate below the Nyquist rate of the time-varying signal, wherein the second sampling rate is different from the first sampling rate; and at least one processor communicatively coupled to the input/output interface to:

A) compute a first Fast Fourier Transform (FFT) for the first sub-sampled set of samples of the time-varying signal; and B) compute a second FFT for the second sub-sampled set of samples of the time-varying signal, wherein:

each of the first FFT and the second FFT is a low-radix FFT;

the time-varying signal has a frequency bandwidth of interest BW and a Nyquist sampling criteria of N samples in a sampling time T, wherein N=T×BW;

the first sampling rate is BW/$p_1$ samples/second, wherein $p_1$ is less than N;

the second sampling rate is BW/$p_2$ samples/second, wherein $p_2$ is less than N; and $p_2$ and $p_1$ are co-prime numbers.

2. The apparatus of claim 1, wherein the apparatus is implemented as an Application Specific Integrated Circuit (ASIC).

3. The apparatus of claim 1, wherein the at least one processor computes the N-point FFT of the time-varying signal based at least in part on A) and B), and wherein the input/output interface is configured to output a digital representation of the N-point FFT so as to provide an indication of the one or more frequency components of the sampled time-varying signal.

4. The apparatus of claim 1, wherein:
at least one of the first and second FFTs is a radix-2 FFT; and
another of the first and second FFTs is a radix-3 FFT.

5. An integrated circuit apparatus to determine an N-point Fast Fourier Transform (FFT) of a time-varying signal so as to sense one or more frequency components of the time-varying signal, the apparatus comprising:
an input/output interface to receive a first sub-sampled set of samples of the time-varying signal sampled at a first sampling rate below a Nyquist rate of the time-varying signal and a second sub-sampled set of samples of the time-varying signal sampled at a second sampling rate below the Nyquist rate of the time-varying signal, wherein the second sampling rate is different from the first sampling rate; and
at least one processor communicatively coupled to the input/output interface to:
A) compute a first Fast Fourier Transform (FFT) for the first sub-sampled set of samples of the time-varying signal; and
B) compute a second FFT for the second sub-sampled set of samples of the time-varying signal,
wherein:
each of the first FFT and the second FFT is a low-radix FFT;
the input/output interface is configured to provide to the at least one processor:
the first sub-sampled set of samples at the first sampling rate;
the second sub-sampled set of samples at the second sampling rate;
a third sub-sampled set of samples at the first sampling rate and time-shifted from the first sub-sampled set by a first number of samples; and
a fourth sub-sampled set of samples at the second sampling rate and time-shifted from the second sub-sampled set by a second number of samples; and
the at least one processor further is configured to compute:
C) a third FFT for the third sub-sampled set of samples of the time-varying signal; and
D) a fourth FFT for the fourth sub-sampled set of samples of the time-varying signal, wherein the N-point FFT of the time-varying signal is based at least in part on A), B), C) and D).

6. The apparatus of claim 5, wherein:
the first number of samples is one sample; and
the second number of samples is one sample.

7. The apparatus of claim 5, wherein:
the input/output interface is configured to further provide to the at least one processor:
a fifth sub-sampled set of samples at the first sampling rate and time-shifted from the first sub-sampled set by a third number of samples; and
a sixth sub-sampled set of samples at the second sampling rate and time-shifted from the second sub-sampled set by the third number of samples; and
the at least one processor further is configured to compute:
E) a fifth FFT for the fifth sub-sampled set of samples of the time-varying signal; and
F) a sixth FFT for the sixth sub-sampled set of samples of the time-varying signal, wherein the N-point FFT of the time-varying signal is based at least in part on A), B), C), D), E) and F).

8. The apparatus of claim 7, wherein:
the first number of samples is one sample;
the second number of samples is one sample; and
the third number of samples is 32 samples.

9. A system, comprising:
the integrated circuit apparatus of claim 1; and
an analog-to-digital converter (ADC) apparatus, communicatively coupled to the input/output interface of the integrated circuit apparatus, to provide the first sub-sampled set of samples at the first sampling rate and the second sub-sampled set of samples at the second sampling rate.

10. The system of claim 9, wherein:
the input/output interface is configured to provide to the at least one processor:
the first sub-sampled set of samples at the first sampling rate;
the second sub-sampled set of samples at the second sampling rate;
a third sub-sampled set of samples at the first sampling rate and time-shifted from the first sub-sampled set by a first number of samples; and
a fourth sub-sampled set of samples at the second sampling rate time-shifted from the second sub-sampled set by a second number of samples; and
the at least one processor of the integrated circuit apparatus further computes:
C) a third FFT for the third sub-sampled set of samples of the time-varying signal; and
D) a fourth FFT for the fourth sub-sampled set of samples of the time-varying signal, wherein the N-point FFT of the time-varying signal is based at least in part on A), B), C) and D).

11. The system of claim 10, wherein:
the first number of samples is one sample; and
the second number of samples is one sample.

12. The system of claim 11, wherein:
the at least one input/output interface is configured to further provide to the at least one processor:
a fifth sub-sampled set of samples at the first sampling rate and time-shifted from the first sub-sampled set by a third number of samples; and
a sixth sub-sampled set of samples at the second sampling rate and time-shifted from the second sub-sampled set by the third number of samples; and
the at least one processor of the integrated circuit apparatus further computes:
E) a fifth FFT for the fifth sub-sampled set of samples of the time-varying signal; and
F) a sixth FFT for the sixth sub-sampled set of samples of the time-varying signal, wherein the N-point FFT of the time-varying signal is based at least in part on A), B), C), D), E) and F).

13. The system of claim 12, wherein:
the first number of samples is one sample;
the second number of samples is one sample; and
the third number of samples is 32 samples.

14. The apparatus of claim 1, wherein N is greater than 700,000.

15. The apparatus of claim 14, wherein N=746,496.

16. The apparatus of claim 1, wherein:
the first FFT is a $B_1$-point FFT, wherein $R_1=N/p_1$; and
the second FFT is a $B_2$-point FFT, wherein $R_2=N/p_2$.

17. The apparatus of claim 1, wherein the frequency bandwidth of interest BW is at least approximately 1 GHz.

18. The apparatus of claim 1, wherein the one or more frequency components of the time-varying signal occupy less than or equal to approximately 5% of the frequency bandwidth of interest BW.

19. The apparatus of claim 18, wherein the one or more frequency components of the time-varying signal occupy less than or equal to approximately 2% of the frequency bandwidth of interest BW.

20. The apparatus of claim 19, wherein the one or more frequency components of the time-varying signal occupy less than or equal to approximately 0.1% of the frequency bandwidth of interest BW.

21. The apparatus of claim 1, wherein the one or more frequency components of the time-varying signal respectively represent at least one of:
a Bluetooth signal;
a GSM signal;
a CDMA signal;
a Wi-Fi signal; and
a WiMax signal.

22. An Application Specific Integrated Circuit (ASIC) apparatus to determine an N-point Fast Fourier Transform (FFT) of a sampled time-varying signal so as to sense one or more frequency components of the sampled time-varying signal, the time-varying signal having a frequency bandwidth of interest BW and a Nyquist sampling criteria of N samples in a sampling time T, wherein N=T×BW, the sampled time-varying signal including a first sub-sampled set of $B_1$ samples of the time-varying signal and a second sub-sampled set of $B_2$ samples of the time-varying signal, the apparatus comprising:
an input/output interface to receive the first sub-sampled set of $B_1$ samples and the second sub-sampled set of $B_2$ samples, wherein $B_1=N/p_1$, $B_2=N/p_2$, and wherein $p_2$ and $p_i$ are co-prime numbers and both less than N; and
at least one processor communicatively coupled to the input/output interface to:
A) compute a first $B_1$-point Fast Fourier Transform (FFT) for the first set of $B_1$ samples of the time-varying signal;
B) compute a second $B_2$-point FFT for the second set of $B_2$ samples of the time-varying signal; and
C) compute the N-point FFT of the sampled time-varying signal based at least in part on A) and B),
wherein:
each of the first $B_1$-point FFT and the second $B_1$-point FFT is a low-radix FFT; and
the input/output interface is configured to output the N-point FFT from C) so as to provide an indication of the one or more frequency components of the sampled time-varying signal.

23. A system, comprising:
the ASIC apparatus of claim 22; and
an analog-to-digital converter (ADC) apparatus, communicatively coupled to the input/output interface of the ASIC apparatus, to provide the first sub-sampled set of samples at the first sampling rate and the second sub-sampled set of samples at the second sampling rate.

24. The ASIC apparatus of claim 22, wherein $p_1$ is based on a first radix and $p_2$ is based on a second radix.

25. The ASIC apparatus of claim 24, wherein the first radix and the second radix are small integers.

26. The ASIC apparatus of claim 25, wherein the first radix is 2 or 4 and the second radix is 3.

27. The ASIC apparatus of claim 22, wherein the sampled time-varying signal is a sparse wideband signal.

28. The ASIC apparatus of claim 27, wherein the bandwidth of interest for the sampled time-varying signal is approximately 1 GHz.

29. The ASIC apparatus of claim 28, wherein one or more frequency components of the sampled time-varying signal occupy less than or equal to approximately 0.1% of the bandwidth of interest for the sampled time-varying signal.

30. An application specific integrated circuit (ASIC) apparatus for calculating a Fast Fourier Transform (FFT) of a signal, the ASIC apparatus comprising:
an input/output interface adapted to receive a discrete z-point signal, z being a product of at least two numbers;
one or more first $x^n$-word memory blocks configured to store $x^n$ signal points sub-sampled by $z/x^n$ from the z-point signal;
one or more second $y^m$-word memory blocks configured to store $y^m$ signal points sub-sampled by $z/y^m$ from the z-point signal, wherein x and y are co-prime numbers and n and m are natural numbers, and
a microprocessor for calculating the FFT of the signal, the microprocessor comprising:
a bucketization microarchitecture to sub-sample the received signal and alias signal points to buckets whose number is less or equal to z, and
a reconstruction microarchitecture designed to estimate a magnitude value and a frequency index of one or more frequency components of the z-point signal.

* * * * *